Dec. 11, 1923.
M. G. DE SIMONE
1,476,804
DENOMINATOR AND ADDING MACHINE
Filed July 3, 1914    20 Sheets-Sheet 1
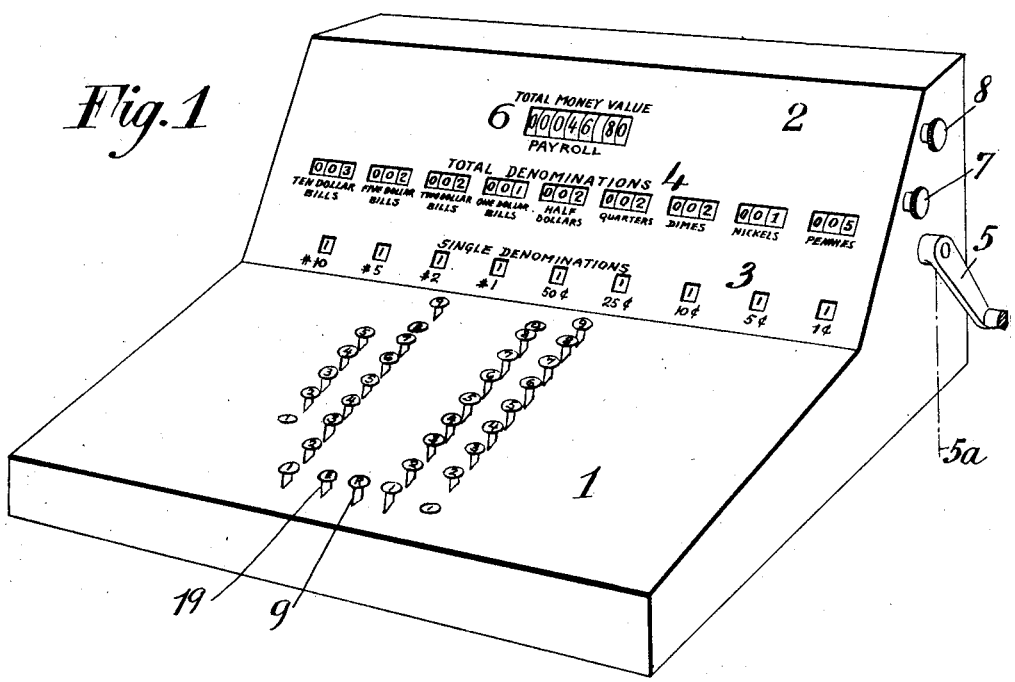
*Fig.1*
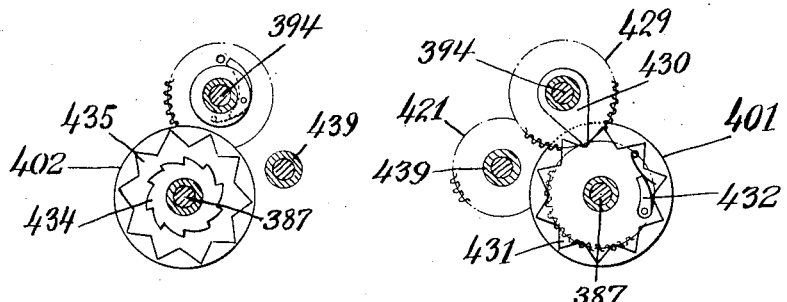
*Fig.53*    *Fig.54*
Witnesses:
Michele G. de Simone Inventor
By his Attorneys

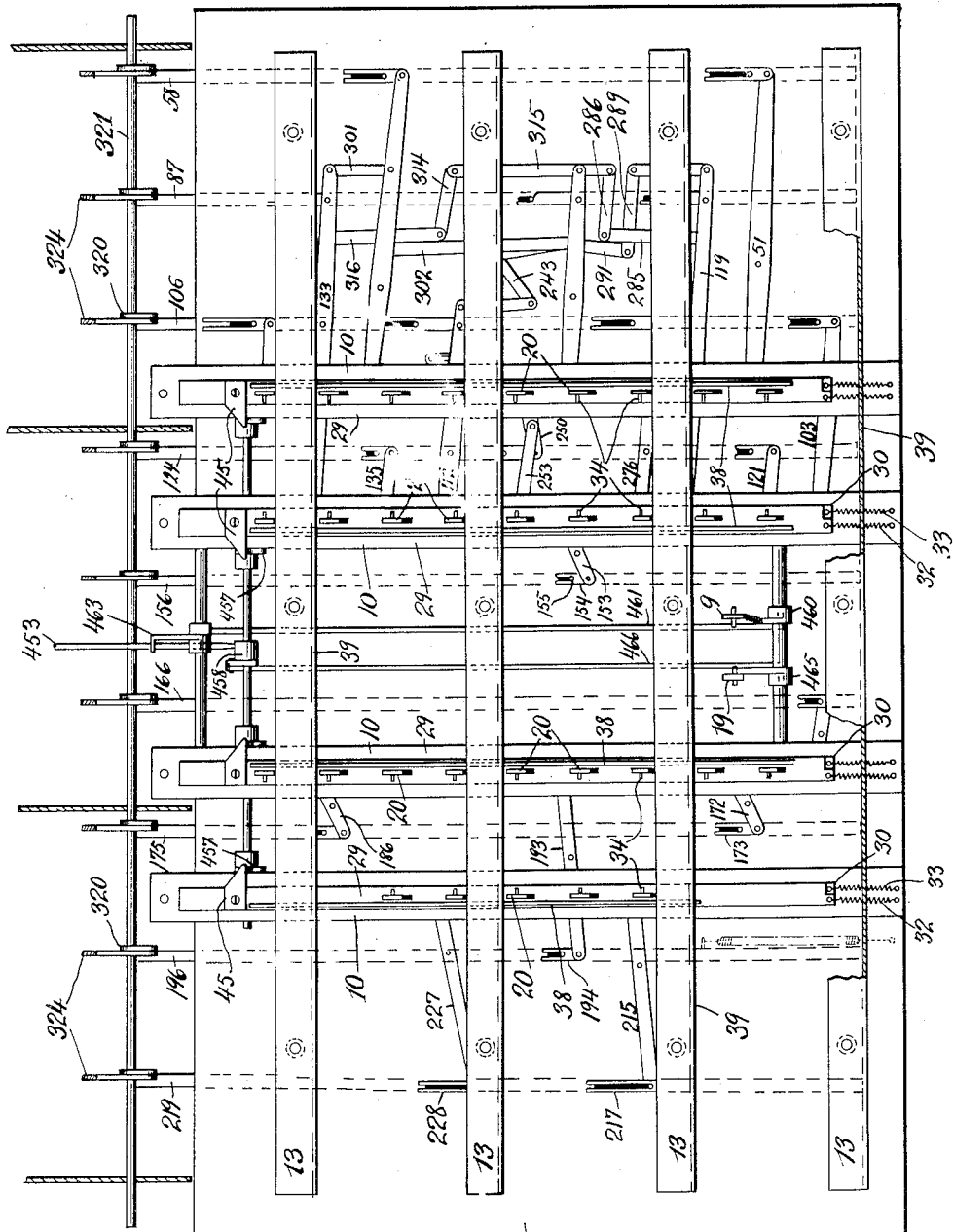

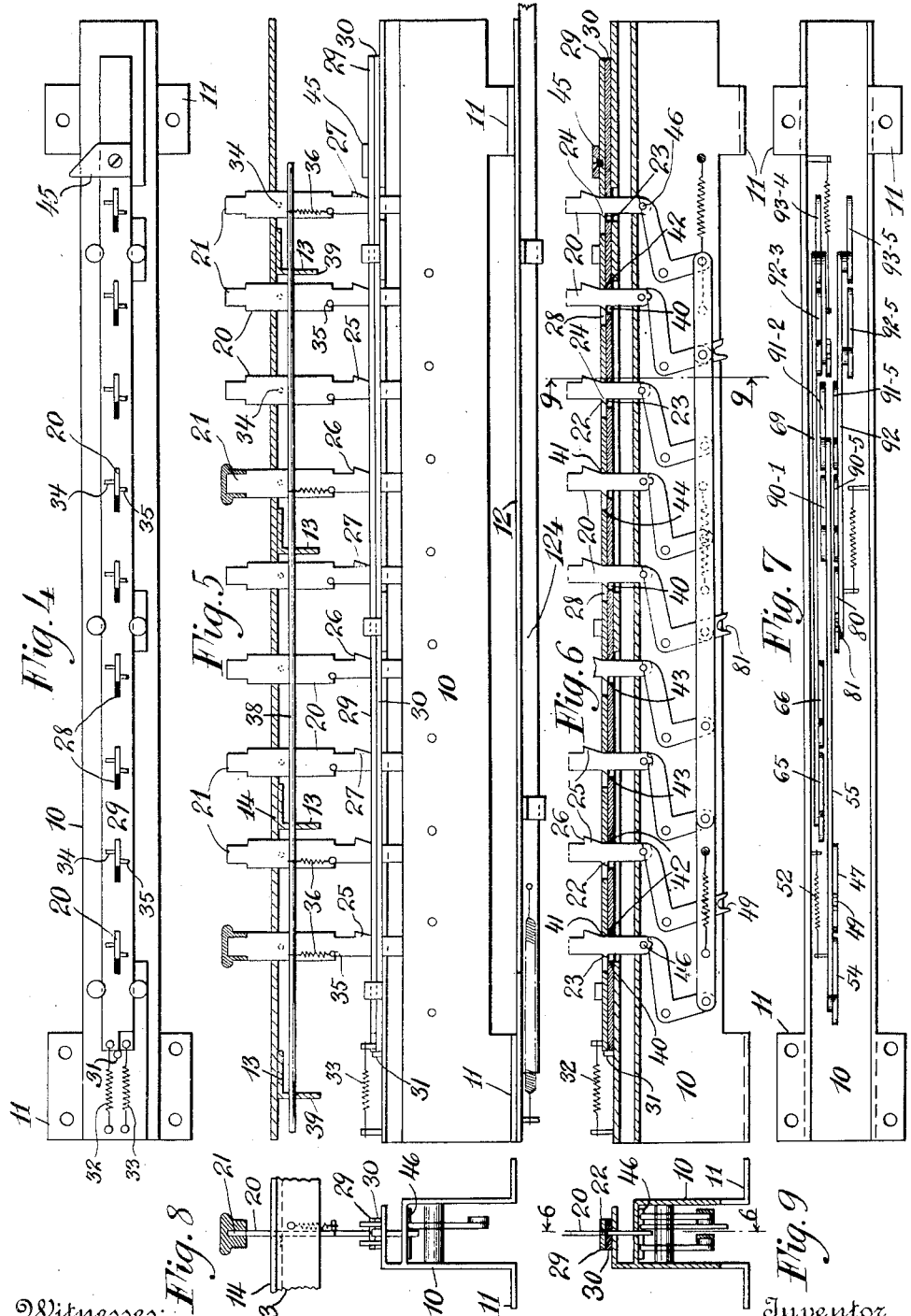

Dec. 11, 1923.
M. G. DE SIMONE
1,476,804
DENOMINATOR AND ADDING MACHINE
Filed July 3, 1914    20 Sheets-Sheet 5
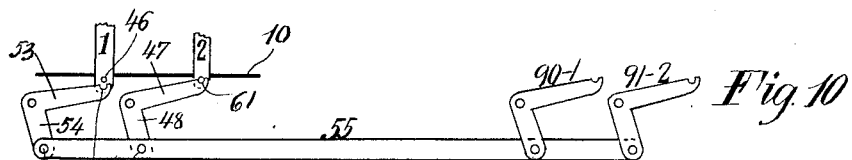
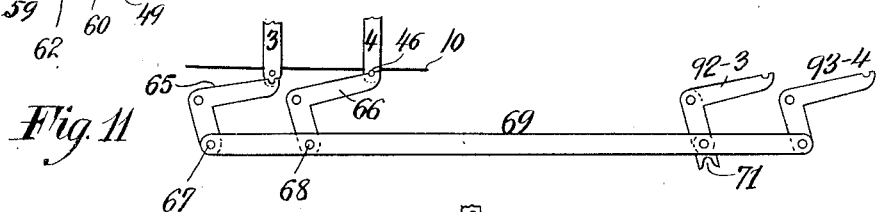
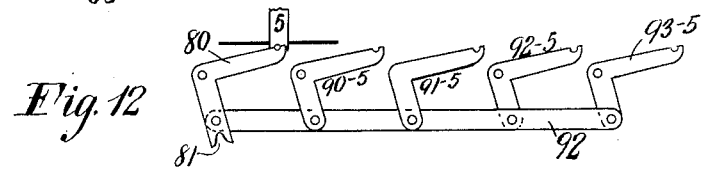
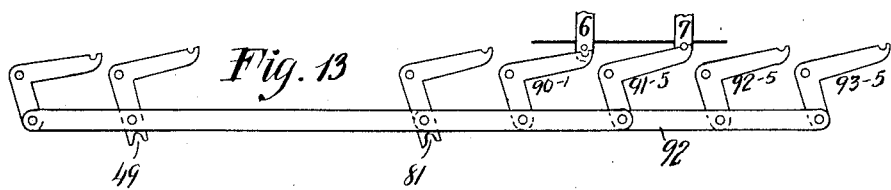

Dec. 11, 1923.
M. G. DE SIMONE
1,476,804
DENOMINATOR AND ADDING MACHINE
Filed July 3, 1914    20 Sheets-Sheet 6
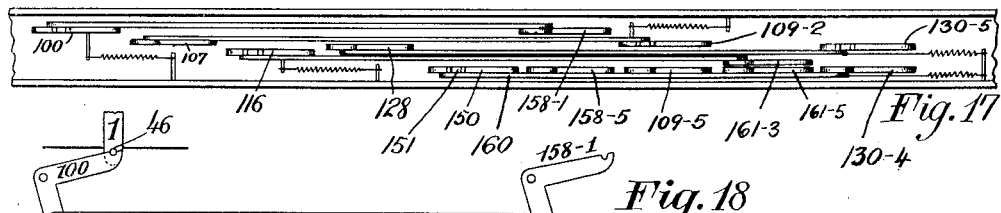
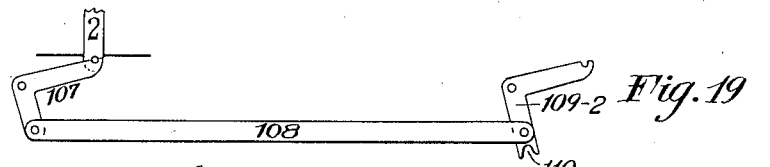
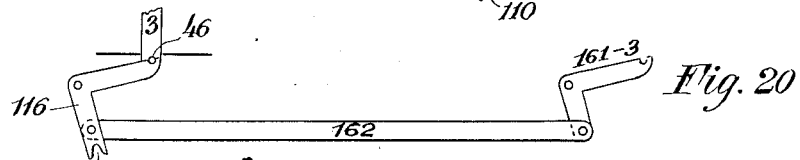
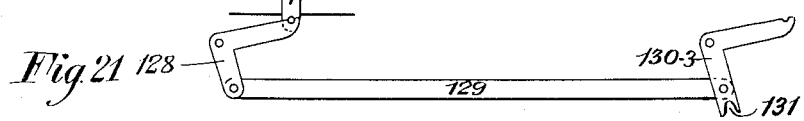
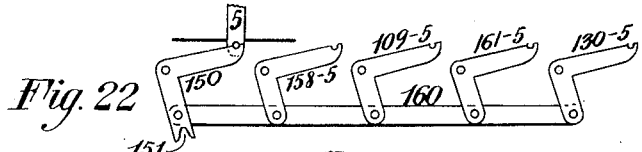
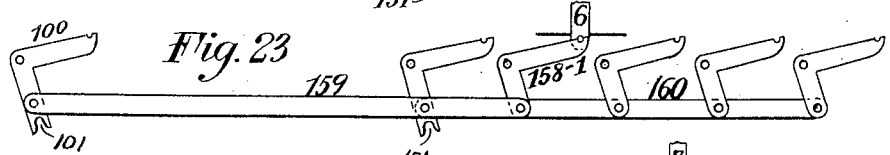
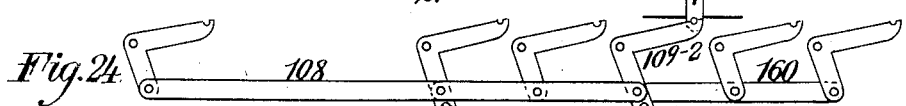
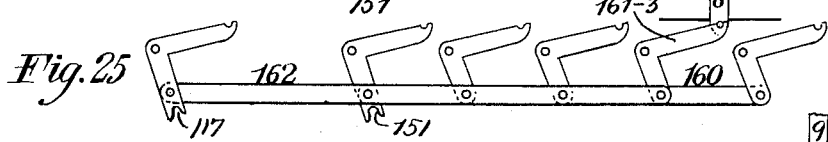
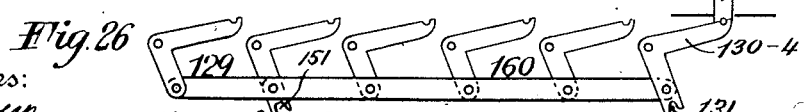

Dec. 11, 1923.　　　　　　　　　　　　　　　　1,476,804
M. G. DE SIMONE
DENOMINATOR AND ADDING MACHINE
Filed July 3, 1914　　　20 Sheets-Sheet 7
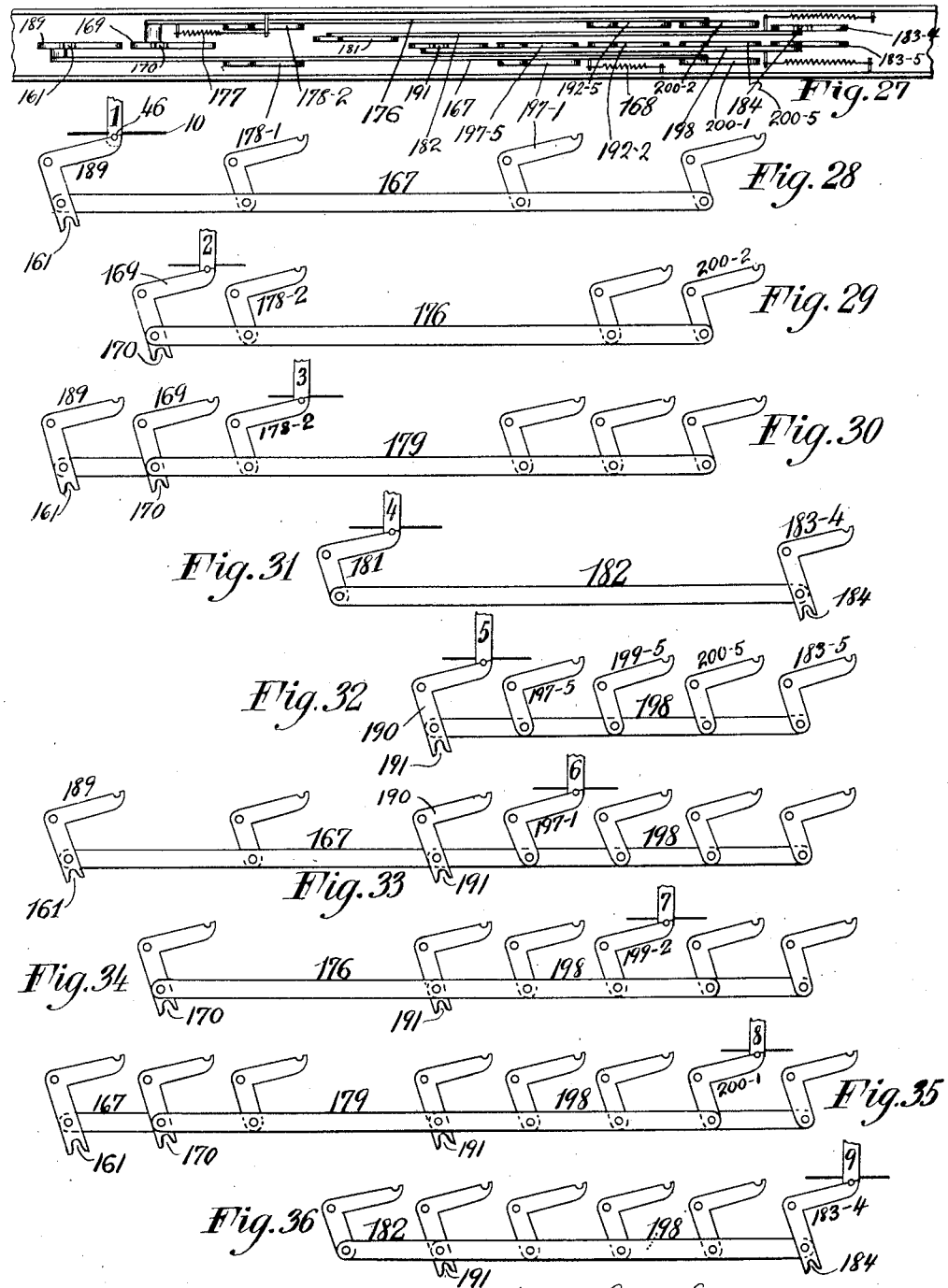

Dec. 11, 1923.

M. G. DE SIMONE

DENOMINATOR AND ADDING MACHINE

Filed July 3, 1914   20 Sheets-Sheet 8

Dec. 11, 1923.  
M. G. DE SIMONE  
1,476,804  
DENOMINATOR AND ADDING MACHINE  
Filed July 3, 1914   20 Sheets-Sheet 11

Dec. 11, 1923.                                                                    1,476,804
M. G. DE SIMONE
DENOMINATOR AND ADDING MACHINE
Filed July 3, 1914        20 Sheets-Sheet 12

Dec. 11, 1923.

M. G. DE SIMONE 1,476,804

DENOMINATOR AND ADDING MACHINE

Filed July 3, 1914  20 Sheets-Sheet 14

Fig. 45

Witnesses:

Inventor
Michele G. de Simone
By his Attorneys

Dec. 11, 1923.

M. G. DE SIMONE 1,476,804

DENOMINATOR AND ADDING MACHINE

Filed July 3, 1914   20 Sheets-Sheet 16

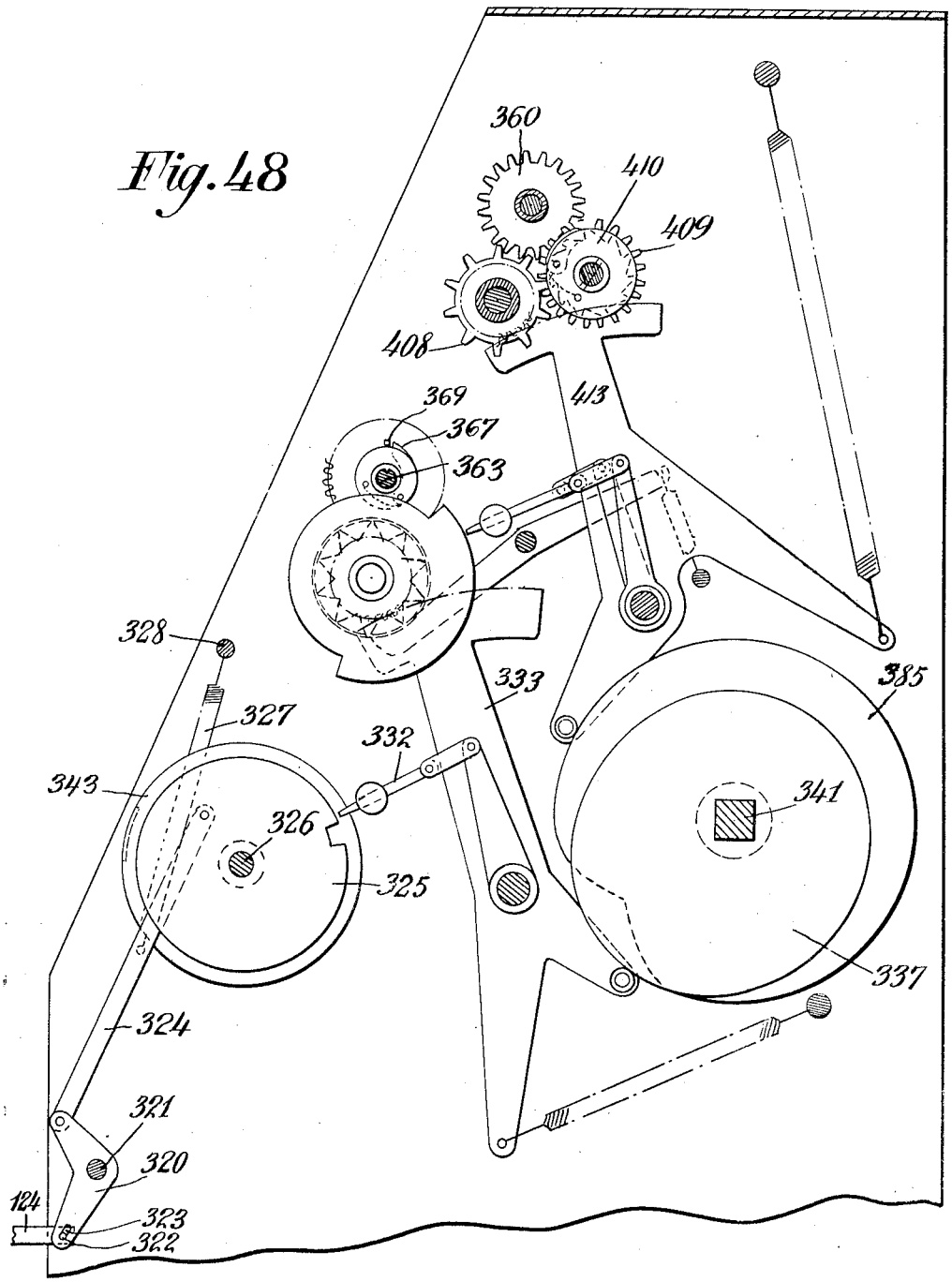

Dec. 11, 1923.
M. G. DE SIMONE
1,476,804
DENOMINATOR AND ADDING MACHINE
Filed July 3, 1914     20 Sheets-Sheet 18
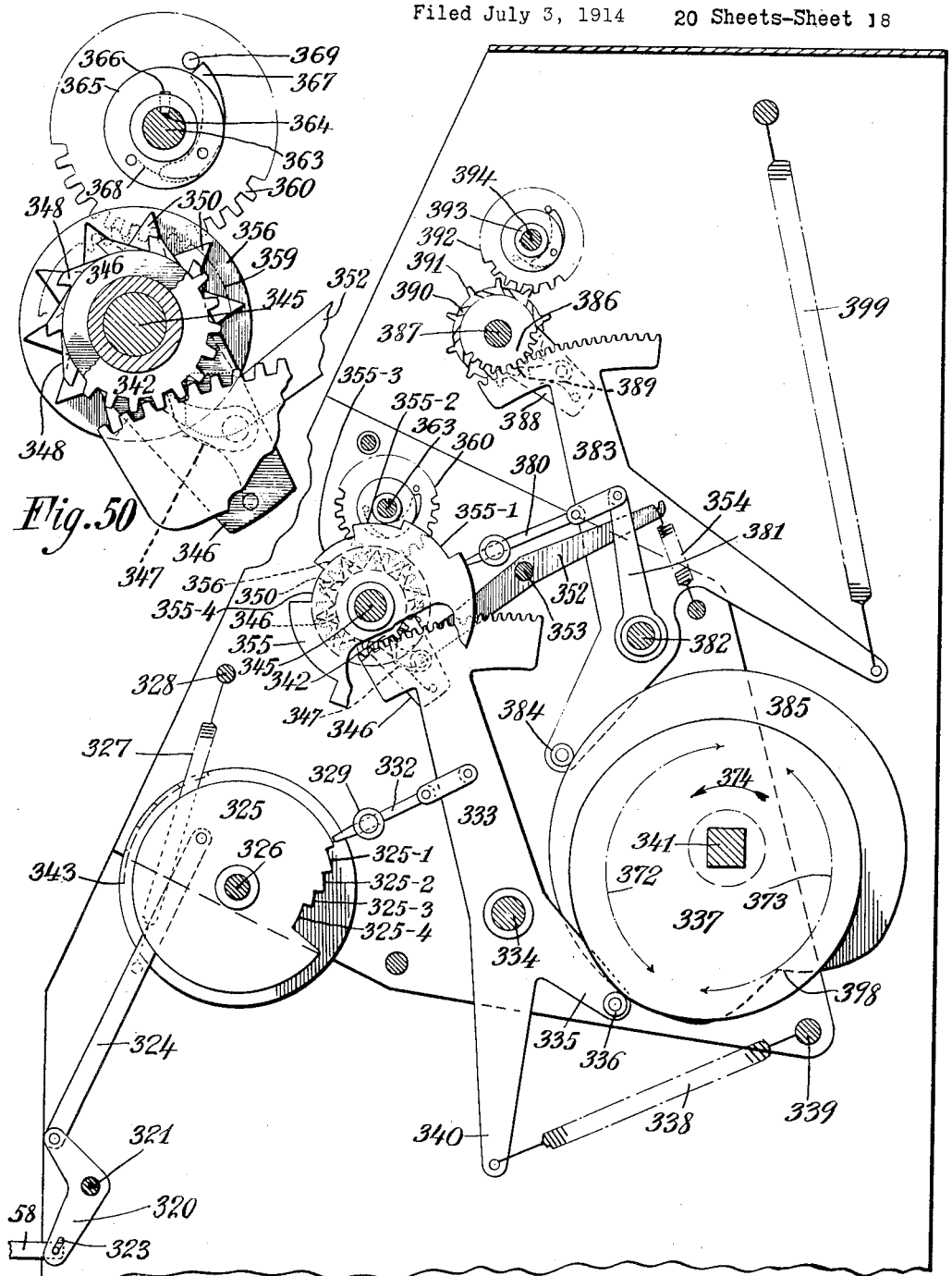

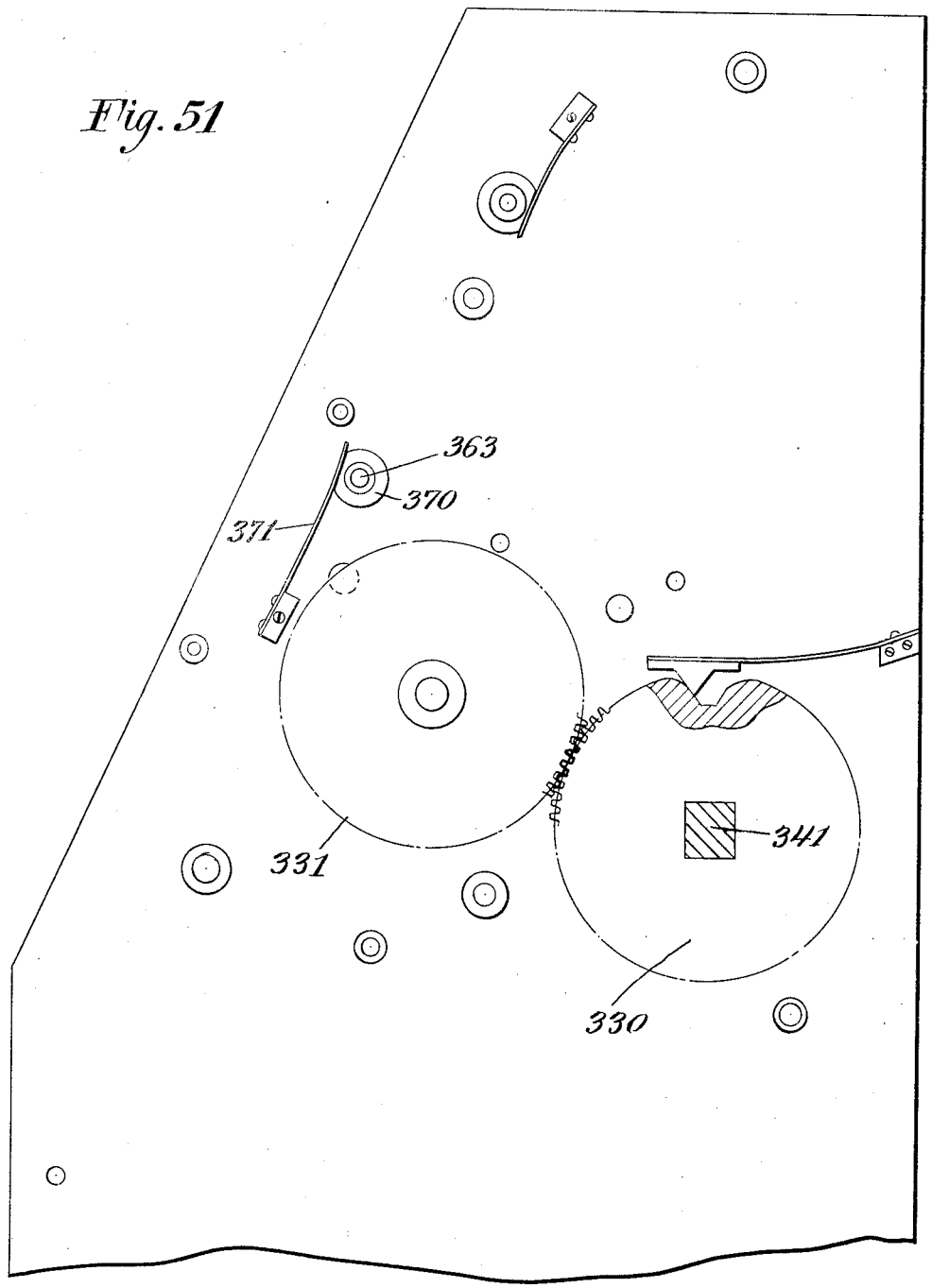

Patented Dec. 11, 1923.

1,476,804

UNITED STATES PATENT OFFICE.

MICHELE GUGLIELMO DE SIMONE, OF STAPLETON, NEW YORK, ASSIGNOR, BY MESNE ASSIGNMENTS, TO NEW YORK CALCULATING MACHINE COMPANY, INC., A CORPORATION OF NEW YORK.

DENOMINATOR AND ADDING MACHINE.

Application filed July 3, 1914. Serial No. 848,741.

*To all whom it may concern:*

Be it known that I, MICHELE GUGLIELMO DE SIMONE, a subject of the King of Italy, residing at Stapleton, county of Richmond, city and State of New York, have invented certain new and useful Inventions in Denominator and Adding Machines, of which the following is a specification.

More particularly, this invention relates to arrangement whereby a given monetary value is "analysed" into certain predetermined currency of such value and number that the equivalent summation of the same is equal to the given monetary value. For most commercial purposes to which my invention is adapted, it is desirable to "analyse" the given monetary value or values into subordinate denomination values so that a minimum number of bills or coins or both will be indicated, the sum of such fractional currency and bills being equal to the given monetary value or values.

Another object of my invention is to provide mechanism for transferring the "analysed" monetary value integrally to a suitable recording or indicating device, and for recording and indicating the equivalent summation of such "analysed" monetary value.

In addition, on successive operation of a number of monetary values, such recording or indicating device serves also to record or indicate the total number of bills and coins respectively required for said monetary values, and the total summation of such successively "analysed" monetary values.

In general, my invention comprises a keyboard, an "analysis" mechanism controlled by the key-board, and a series of indicators controlled by such "analysis" mechanism. Thus, by manipulating the keys corresponding to a given money value, the "analysis" mechanism "analyses" the said given money value into the requisite bills and coins and the number of the same, and the result of such "analysis" is indicated by indicators for the respective bills and fractional currency. For example, taking the value $27.89, the keys of my machine are manipulated by actuating the "2" key in the decimal dollar bank or series of keys, the "7" key in the unit dollar bank or series of keys, the "8" key in the decimal cent bank or series of keys and the "9" key in the unit cent bank or series of keys. In the preferred form of my invention such actuation or manipulation of keys in the respective banks or series of keys may be done in any permutation or order, or the proper keys of the respective banks may be manipulated simultaneously. Such manipulation or actuation produces through suitable "analysis" mechanism the indication of the $10. indicator to "2," the indication of the $5. indicator to "1," the indication of the $2. indicator to "1," (the indication of the $1. indicator remaining at "0"), and the indication of the half-dollar indicator to "1," the indication of the quarter indicator to "1," the indication of the dime indicator to "1," (the indication of the nickel indicator remaining at "0") and the indication of the penny indicator to "4." Thus the total of two $10. bills, one $5. bill, one $2. bill, one half-dollar, one quarter, one dime, and four cents gives the total of $27.89, the given monetary value.

In the usual forms of my denominator machine, the "analysis" mechanism directly controls the respective indicators of a series giving the bills and fractional currency for the monetary value represented by the depressed keys, which series of indicators is referred to hereinafter as the "single denomination series." There is further provided a second series of indicators referred to hereinafter as the "total denomination series," the indications of which are controlled by the "analysis" mechanism after the operation of a suitable transfer arrangement, whereby the indications of the single denomination series are respectively transferred to corresponding indicators of such total denomination series. There is further provided a third indicator referred to hereinafter as the "total money value indicator," the indications of which are controlled by the mechanism of the "total denomination series," after the operation of a suitable transfer arrangement, whereby the indications of the "total denomination series" are transferred in intrinsic money value to the "total money value indicator," and at the same time causing the entire mechanism to assume neutral position preparatory to subsequent operation. Upon further manipulation of the keys of the key-board for a second monetary value the indicators of the single denomination series are properly actuated as above described, and upon operation of the transfer arrangements, the indicators of the total denomination series indicate the sum of the bills and fractional currency of the two monetary values, and the total money value indicator indicates the sum of the two monetary values. In illustration, let us assume the first monetary value to be $27.89 and the second monetary value to be $18.91. Upon proper manipulation of the key-board for the first value of $27.89, the indicators of the single denomination series will respectively indicate schematically as follows:—

| $10. | $5. | $2. | $1. | 50¢ | 25¢ | 10¢ | 5¢ | 1¢ |
|---|---|---|---|---|---|---|---|---|
| 2 | 1 | 1 | 0 | 1 | 1 | 1 | 0 | 4 |

Upon operation of the transfer mechanism, the above indications are respectively transferred to the corresponding indicators of the total denomination series, and the total money value indicator will indicate 00027 89 whereupon the entire mechanism assumes neutral position, while the indicators of the single denomination series are all brought to zero reading.

The key-board is now properly manipulated for the second monetary item of $18.91, and accordingly the indicators of the single denomination series show as follows:

| $10. | $5. | $2. | $1. | 50¢ | 25¢ | 10¢ | 5¢ | 1¢ |
|---|---|---|---|---|---|---|---|---|
| 1 | 1 | 1 | 1 | 1 | 1 | 1 | 1 | 1 |

Upon operation of the transfer mechanism, the above indications are respectively transferred to the corresponding indicators of the total denomination series and respectively added to the indications of the first monetary item, indicating the following result:

| $10. | $5. | $2. | $1. | 50¢ | 25¢ | 10¢ | 5¢ | 1¢ |
|---|---|---|---|---|---|---|---|---|
| 3 | 2 | 2 | 1 | 2 | 2 | 2 | 1 | 5 | and the total money value indicator reads the sum of the two items, namely—

00046 80

Without altering the desired results attained by my invention, the indications of the single denomination series may be omitted.

In the above example of use the same is set forth in reference to a lesser range machine in which the highest denomination in currency is the ten dollar U. S. bill, or equivalent, and it will be understood that the same principle is employed in machines embodying a wider range, i. e., higher denominations, as for example, twenty dollar, fifty dollar and other higher U. S. bills or equivalent. In the specific value of $46.80, for such wider range machine, the indication or operation of the denomination devices is:—

| $20. | $10. | $5. | $2. | $1. | 50¢ | 25¢ | 10¢ | 5¢ |
|---|---|---|---|---|---|---|---|---|
| 2 | 0 | 1 | 0 | 1 | 1 | 1 | 0 | 1 |

The total money value indicator can be used as an ordinary adding device controlled directly or indirectly by the keys of the key-board.

The mechanism of a preferred form of my invention comprises the arrangement of the keys representing the unit cent values in one series, usually the extreme right hand series, the keys of decimal cent values adjacent thereto to the left, the keys of the unit dollar values adjacent to the latter and further to the left, and the decimal dollar values adjacent the last-named and still further to the left, etc. In such preferred form of my invention, the keys of each series are constructed and arranged in co-operating with controlling mechanism whereby any other key in the same series is positively prevented from being simultaneously or subsequently manipulated. In the event that an error has been made by manipulating any wrong key or keys, provision is made for restoring the manipulated keys to normal position by the operation of an "error" key.

The "analysis" mechanism comprises elements separately controlling the movable dials of the respective indicators, and co-acting parts controlling said elements and controlled by the keys of the key-board whereby each money value as represented by the depressed keys is properly "analysed" into the desired denominations. In general, the mechanism for securing such results comprises certain parts separately actuated predetermined movements by particular keys of the key-board to move the movable elements of the indicators to corresponding predetermined positions of indication. Combined with said certain parts are co-operating parts controlled by one or more keys of the key-board to modify or alter the movements of said certain parts and thereby control the said indicators to give the desired indications.

In the form of my invention having a single denomination series of indicators, the movable dial of the penny indicator will have a range of movement from "0" to "4" since four is the maximum number of pennies required for any one monetary value. Accordingly, the "analysis" mechanism controlling the penny indicator comprises parts separately or jointly capable of moving the penny indicator to its respective four positions. Similarly, the nickel, the quarter and the half-dollar indicators have each the range of movement from "0" to "1", since but one each of the said coins are possibly required as a maximum in analysing any given monetary value. Accordingly the "analysis" mechanism comprises parts controlled by the proper keys of the key-board whereby the aforesaid indicators may be moved to the indication "1" whenever one of any of said coins is required. On the other hand, the dime indicator may "read" to the maximum "2" and the "analysis" mechanism includes parts capable of moving the same to either "1" or "2", dependent upon the money value represented by the manipulated key or keys.

With respect to the "one-dollar", "two-dollar" and "five-dollar" indicators, the respective dials of the same have the maximum "reading" of "1", "2" and "1", and the "analysis" mechanism includes parts controlled by the unit and decimal dollar keys for securing corresponding actuation of the said dials. The "ten-dollar" indicator may be provided with a dial reading to any desired maximum indication, and the "analysis" mechanism constructed in accordance therewith.

A particular feature of the preferred form of my denominator machine in which the keys of the key-board are arranged so that the manipulation of the proper keys corresponding to any given money value may be performed simultaneously or in any succession, as desired, is the provision of the parts respectively directly actuated by individual keys, and other parts interconnecting certain of said directly actuated parts, whereby the movements of the latter are modified. In general, the movable dials are controlled by rods respectively connected to the same, and the stroke of such rods is correspondingly allowed for securing the successive indications "1", "2", "3", etc., as the case may be. Ordinarily, for the purpose of simplification, I have arranged a lever having two strokes respectively giving the "1" and the "2" indications and another lever having two or more strokes respectively giving the "3" and "4" indications or the "3", "4" and "5" indications, etc., and have accordingly connected together the keys representing values "analyzable" into one or two, or three or four, etc.

In the case of unit and decimal cent banks of keys, it will be noted that the value "5" introduces coins of different denomination. For example, we will assume that the "2" key in the decimal bank has been manipulated, thereby giving the indication "2" on the dime indicator. If the "5" key in the unit cent bank is now manipulated, the indication "2" on the dime indicator is erased, that is the indication "0" appears and the indication "1" appears on the quarter indicator. Accordingly, the "analysis" mechanism embodies operating parts interconnecting the dime and quarter indicator. Again, assuming that the "3" key of the decimal bank has been manipulated, thereby producing the indication "1" on the quarter indicator and the indication "1" on the nickel indicator, if the "5" key of the unit cent bank is now manipulated, the quarter indicator will not be disturbed but the indicator of the nickel indicator will now show "0" and the dial of the dime indicator will now show "1". Similar changes will be effected in the case of the value 45 cents, 75 cents, 85 cents and 95 cents. Furthermore, it will be noted that like modifications in the indications of the respective indicators will result if the "5" key in the unit cent bank is first manipulated and the key in the decimal cent bank is subsequently manipulated, or simultaneously therewith.

In such preferred form of my denominator machine as described above, the actuation of any indicator of the total denomination series is secured by the use of a segment gear tensioned in a predetermined direction by suitable resilient means under suitable controlling means, the extent of the stroke of the segment gear in such predetermined direction being determined by a throw plate having notches corresponding to the respective indications capable of being given by the corresponding indicator of the single denomination series. When the transfer arrangement is operated, as by a crank lever, such segment gear actuates the corresponding indicator of the total denomination series a like amount, while the indicator of the single denomination series is brought to "0". The operation of the transfer arrangement also effects the actuation of the dial of the total money value indicator by similar segment gears and notched throw plate; however, the value transferred to the total money value indicator is the actual or intrinsic money value represented by the actuated indicator or indicators of the total denomination series. In general, such transfer of like amounts from the indicators of the single denomination series to corresponding indicators of the total denomination series and to the total money value indicator is effected by the use of cams cooperating with the segment gears to effect the operation of the latter in succession, whereby the actuation caused by the respective segment gears takes place in different time intervals. This arrangement also gives an "easy" action in the operation of the transfer arrangement.

The dials of the respective indicators of the total denomination series may read to any desired maximum values, and such maximum will be chosen in accordance with the needs of the user.

Preferably, the dial elements of the several indicators of the total denomination series are arranged to be brought to zero reading by suitable means accessible to the operator when in position in front of the denominator machine. Likewise, the dial elements of the total money value indicator are arranged to be brought to zero reading by the operation of a suitable device within reach of the operator.

If desired, the respective movable dials of the single denomination series and of the total denomination series and of the total money value indicator may be associated with suitable printing mechanisms for printing or otherwise recording the data given by the several indications of these indicators, and control levers provided for securing relative movement between the said printing mechanisms and the sheet of paper or other recording material. It is advantageous to operate the printing mechanism of the single denomination series by means of the crank lever of the transfer arrangement and to provide printing mechanism directly controlled by the keys of the key-board and also operated by the crank lever of the transfer arrangement, printing each monetary value represented upon the successive manipulation of the key-board and the required denominations for each successive monetary value being printed in correspondence in separate columns. In such construction, the printing mechanism of the total denomination series of indicators and of the total money value indicator is operated when the keys of the key-board have been manipulated for the entire or complete series of monetary values, thereby printing the total or sum of the several monetary values and the required total number of bills and coins.

Further objects and features of my invention will be more fully understood from the following description and the accompanying drawings, in which—

Fig. 1 is a front perspective view of a denominator machine embodying my invention;

Fig. 3 is a plan view showing the operating keys and certain mechanism actuated thereby on a greater scale than that shown in Fig. 2;

Figure 2:
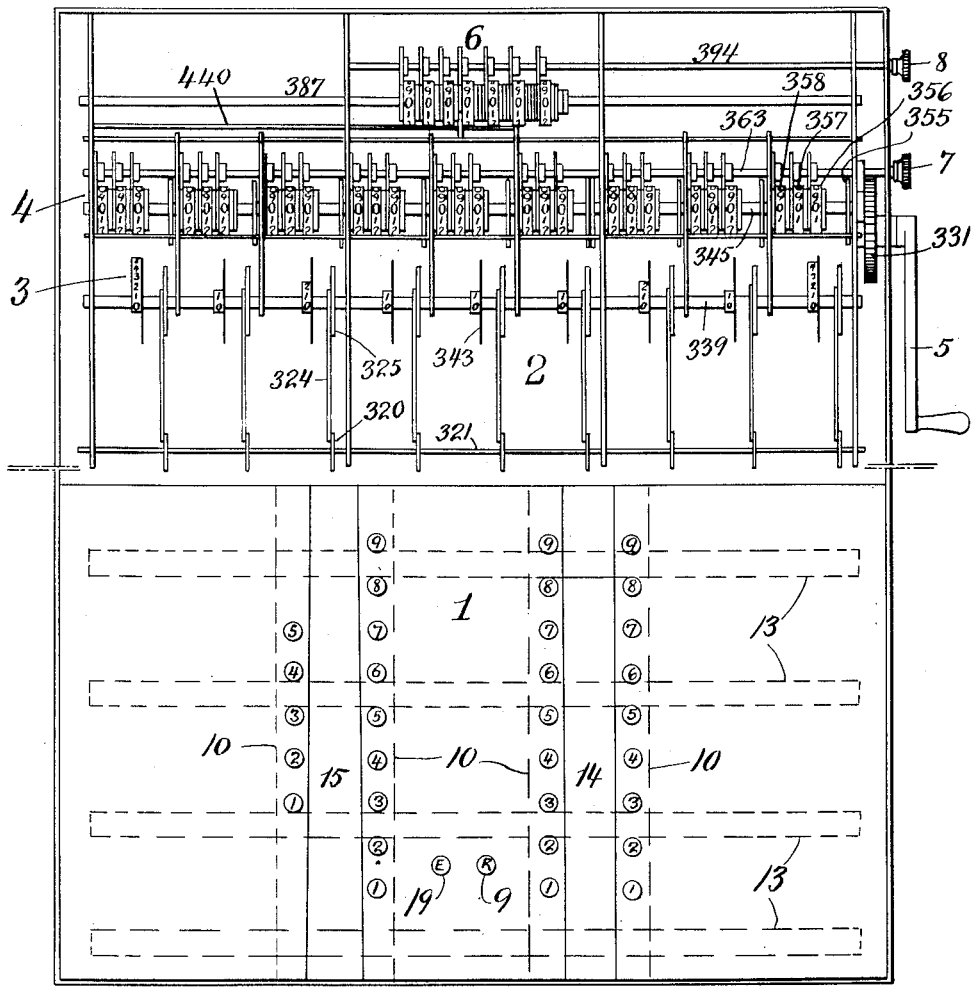
Fig. 2 is a developed plan view of the same, somewhat enlarged, with the certain parts removed to show a general view of the operating mechanism.
Figure 37:
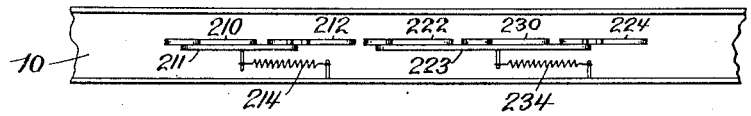
Figure 38:
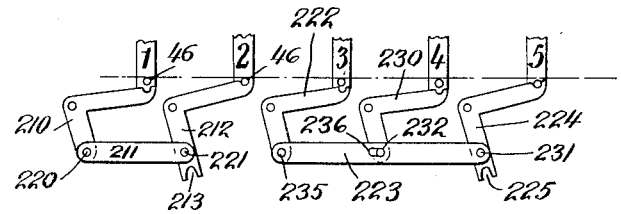
Figure 39:
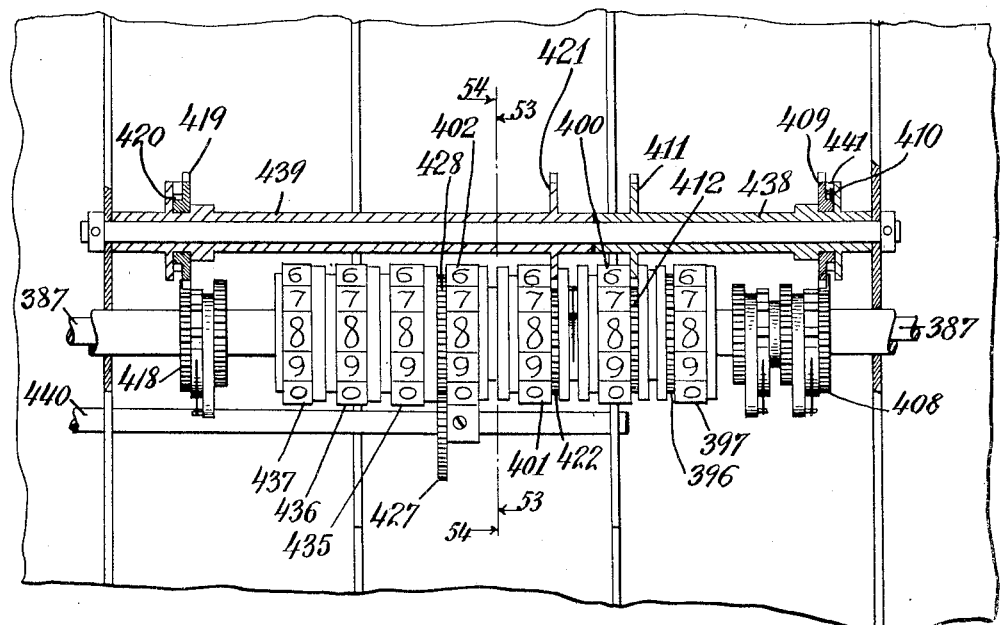
Figure 40:
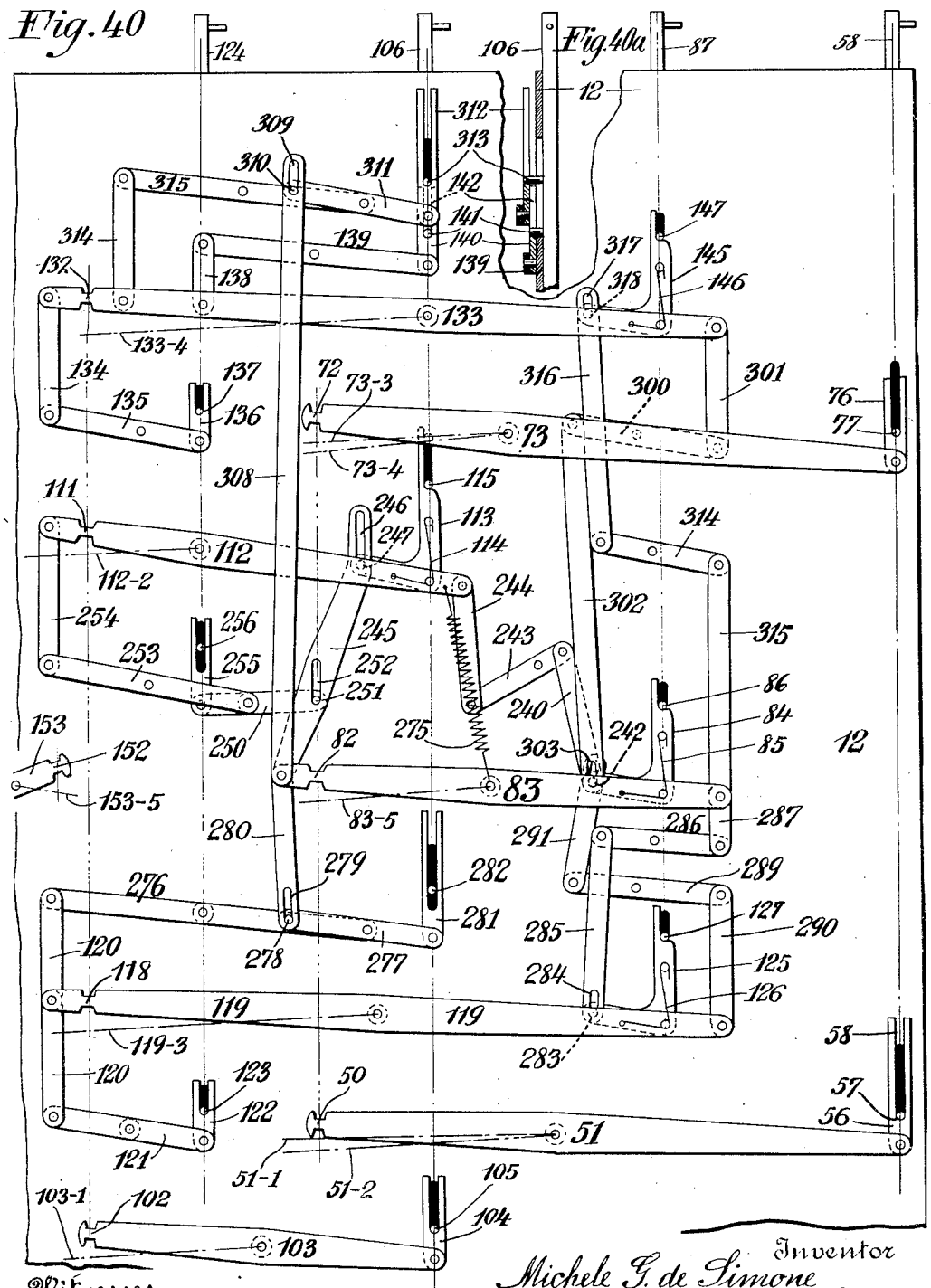
Figure 41:
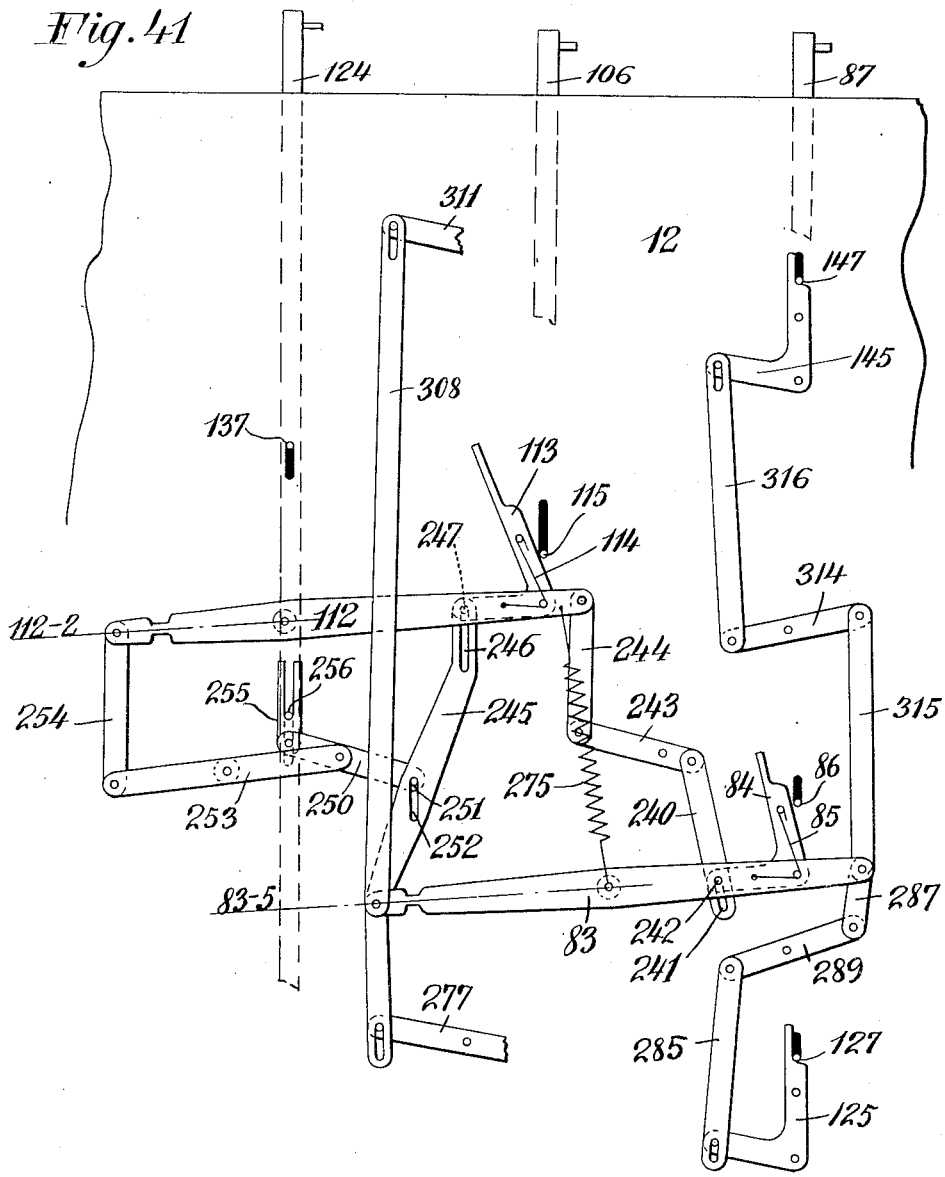
Figure 42:
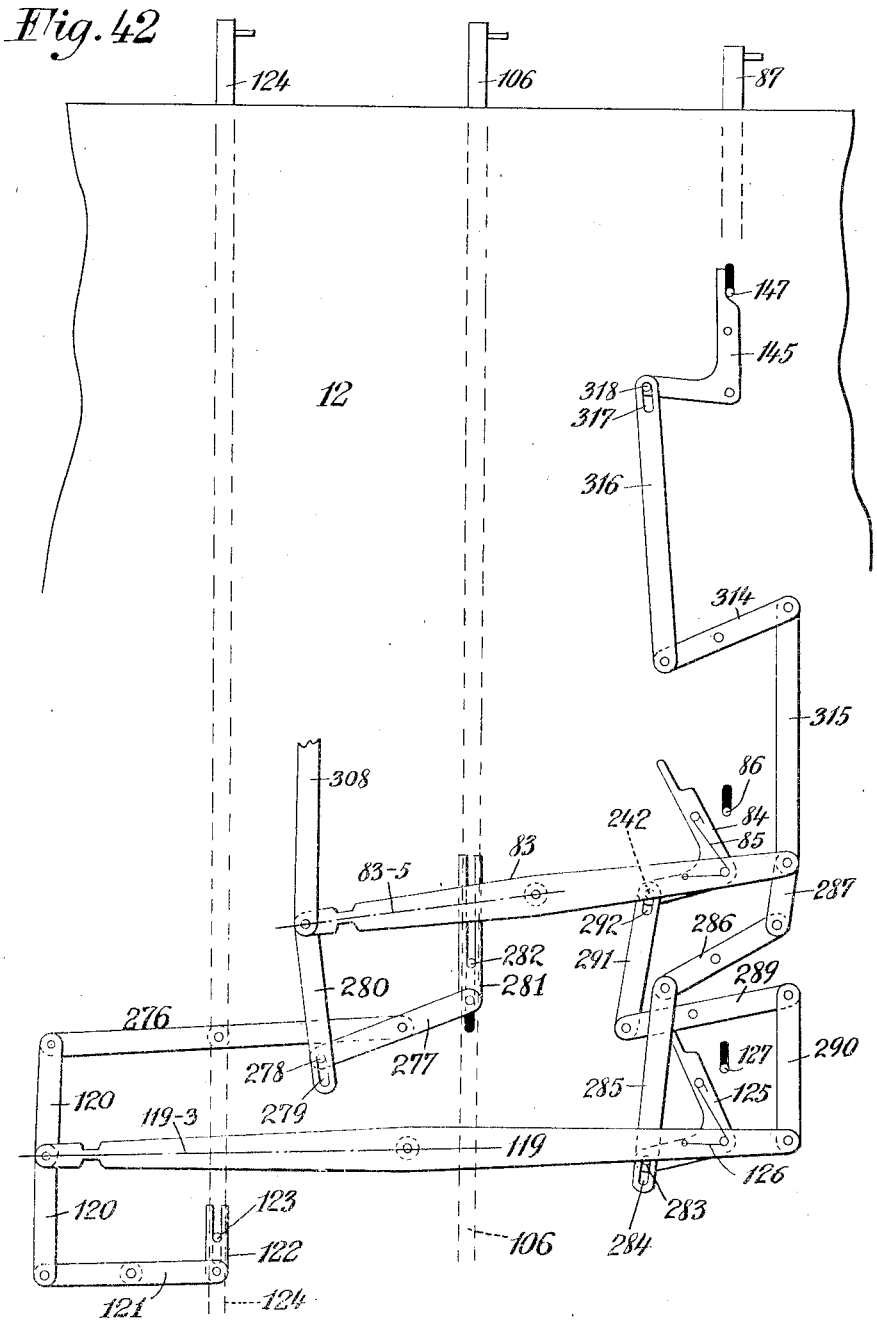
Figure 43:
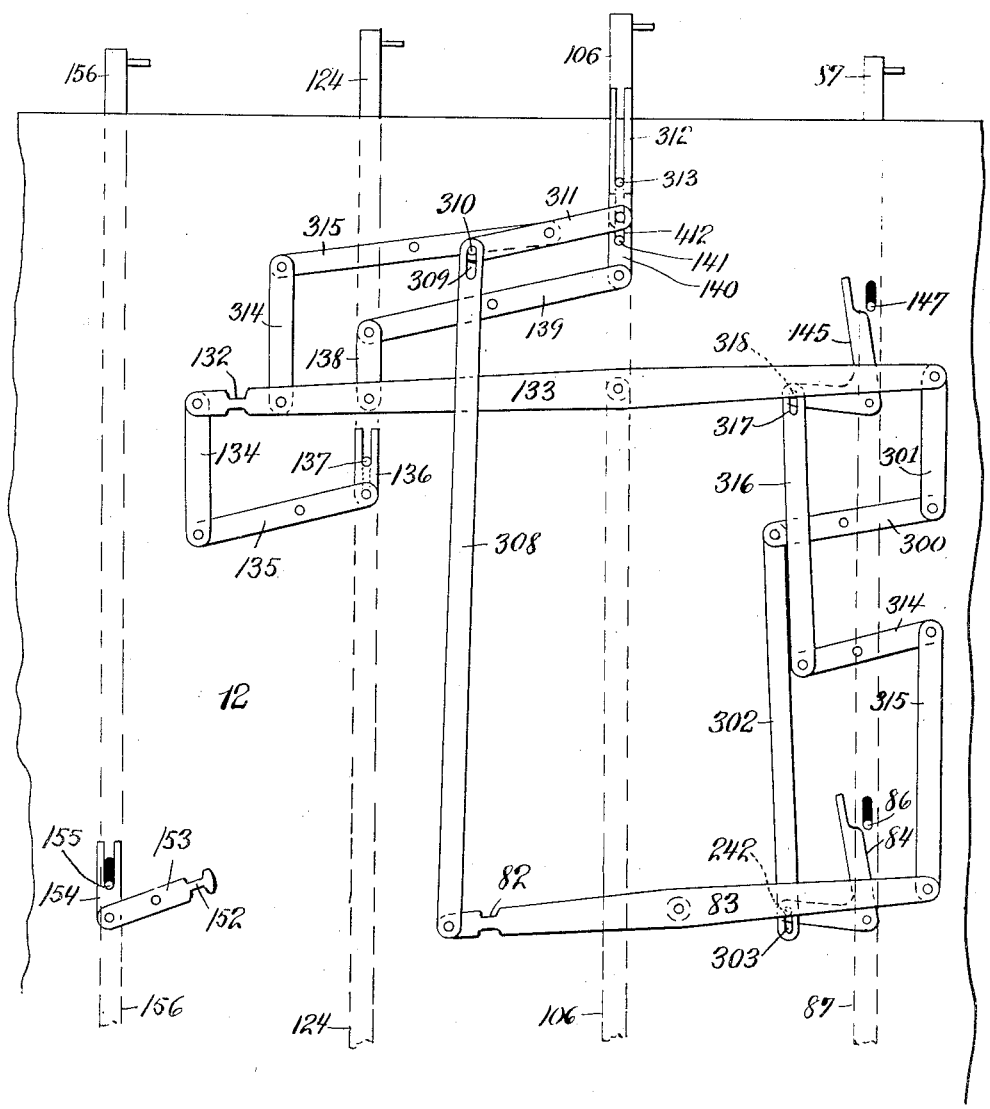
Figure 44:
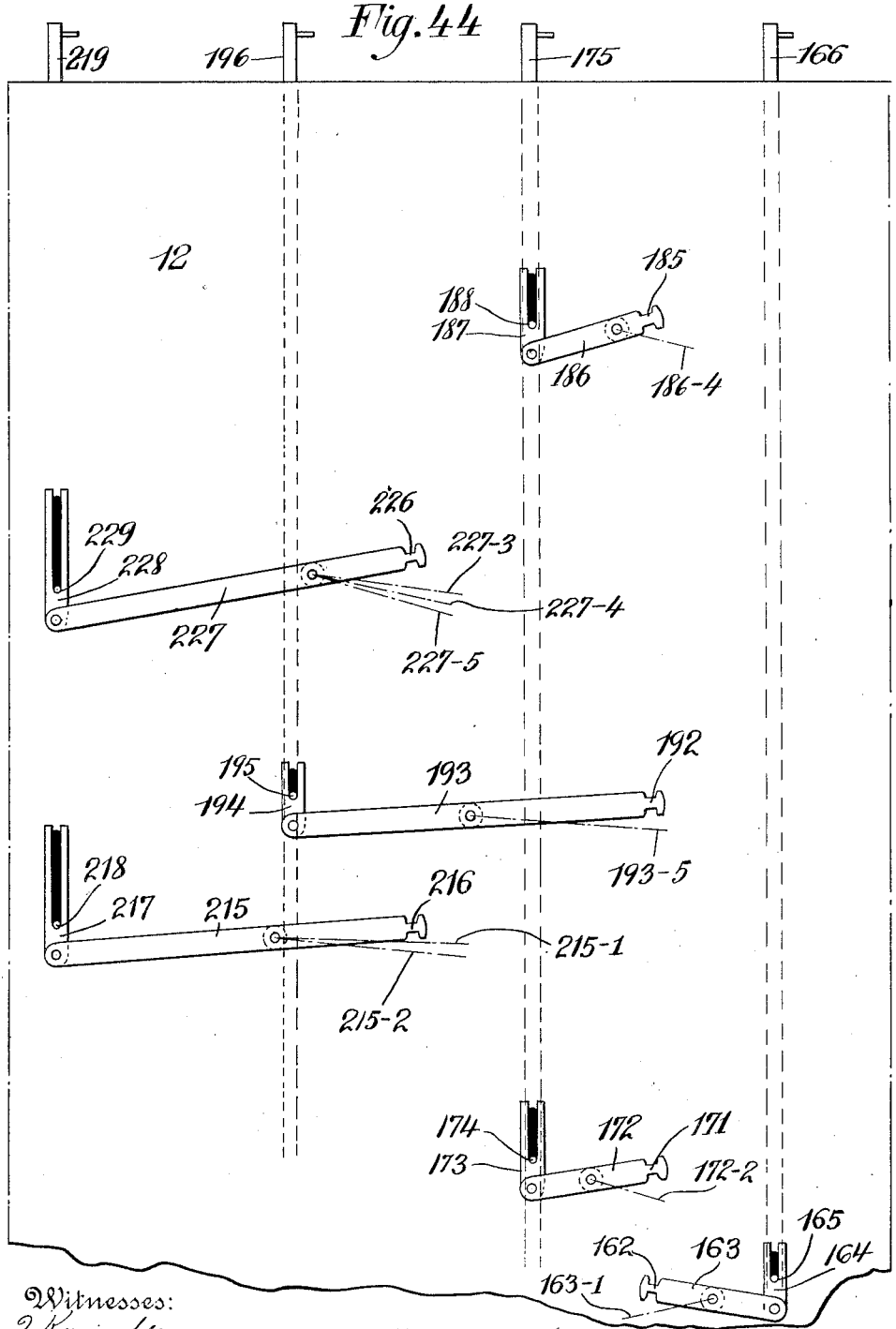
Figure 46:
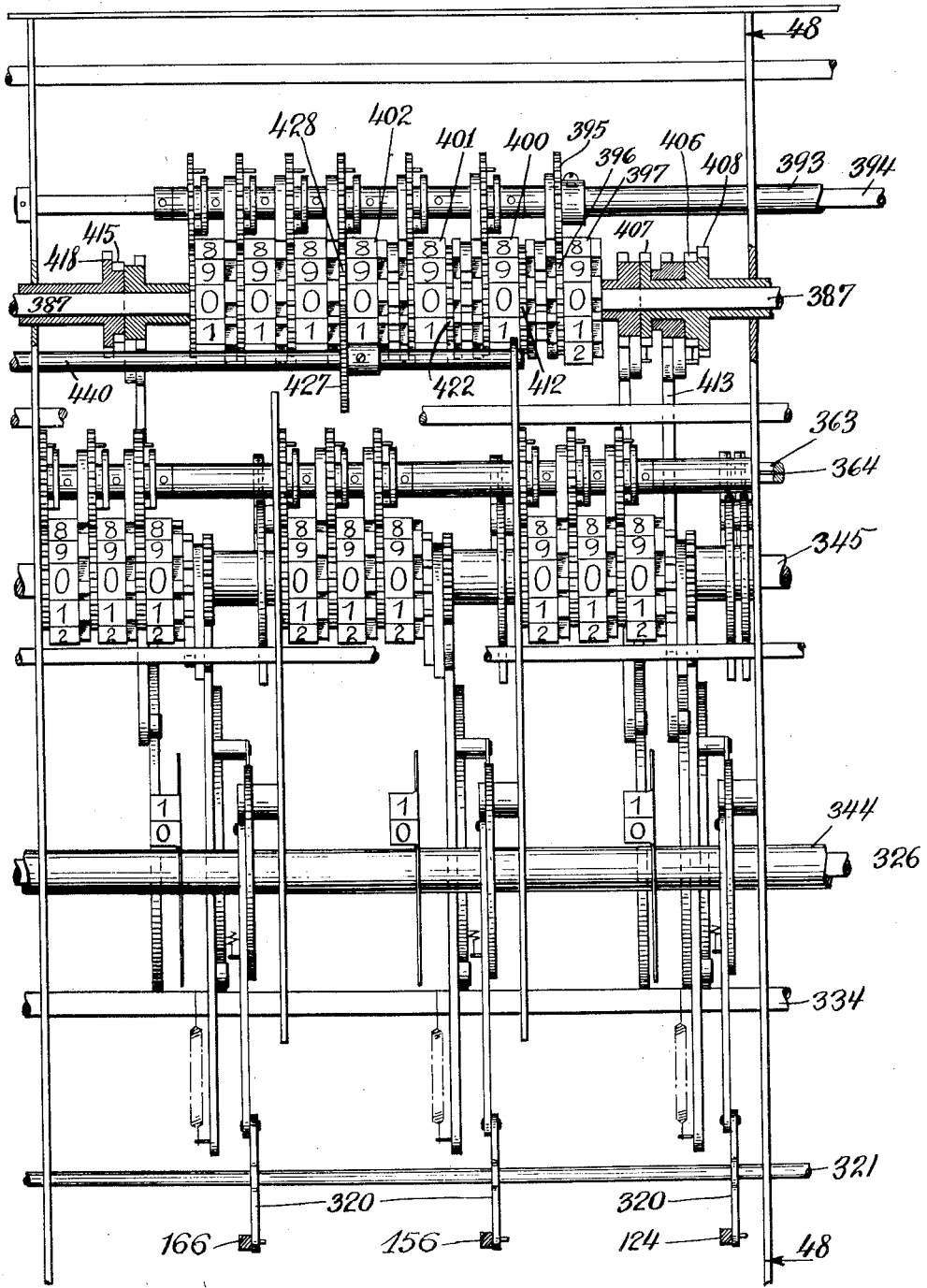
Figure 47:
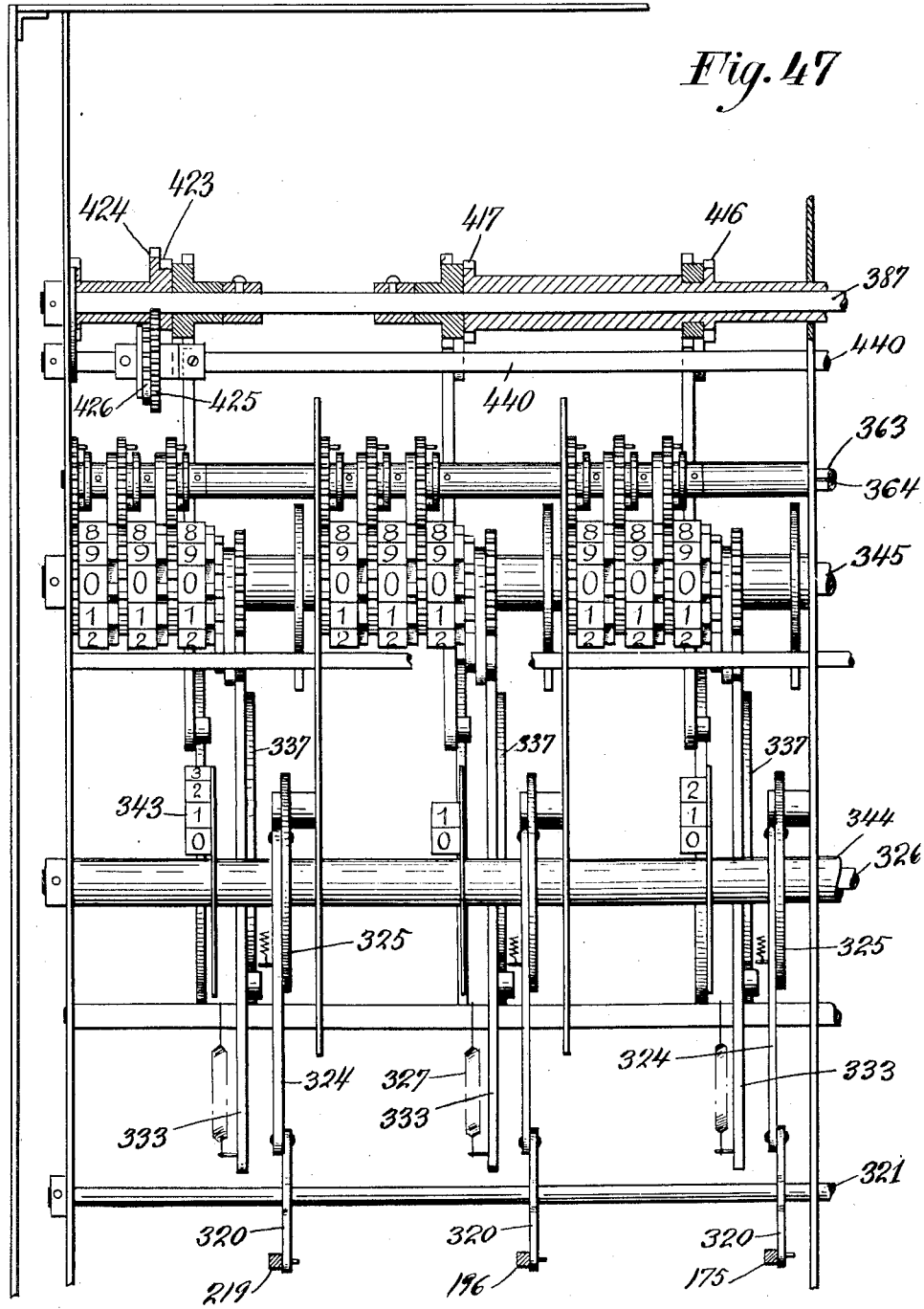

Fig. 4 is a plan view of the bank of keys corresponding to unit cent values of the denominator machine illustrated in the preceding figures; Fig. 5 is a side elevation of Fig. 4; Fig. 6 is a sectional elevation taken on line 6—6 of Fig. 9; Fig. 7 is a bottom plan view of the bank of keys shown in Fig. 4, with certain parts removed; Fig. 8 is an end elevation of Fig. 6, as seen from the left; Fig. 9 is a transverse section taken on line 9—9 of Fig. 6, viewed in the direction of the indicating arrows;

Figs. 10, 11, 12, 13 and 14 are detail views in side elevation, illustrating the relation of particular keys of unit cent values, and mechanism controlled respectively thereby;

Figs. 15 and 16 are detail sectional elevations illustrating two keys of a bank of keys, having particular reference to the locking and release mechanism thereof;

Fig. 17 is a detail bottom plan view of a portion of the bank of keys corresponding to decimal cent values of the denominator machine shown in preceding figures;

Figs. 18, 19, 20, 21, 22, 23, 24, 25 and 26 are detail side elevations indicating the relation of particular keys of decimal cent values and mechanism controlled respectively thereby;

Fig. 27 is a detail bottom plan view of a portion of the bank of keys corresponding to unit dollar values of the aforesaid denominator machine;

Figs. 28 to 36 inclusive, are detail views in side elevation of particular keys of unit dollar values, and mechanism respectively controlled thereby;

Fig. 37 is a detail bottom plan view of a portion of the bank of keys corresponding to decimal dollar values of the aforesaid denominator machine; Fig. 38 is a detail view in side elevation of the same showing the relation of the particular keys to one another and mechanism controlled thereby;

Fig. 39 is a detail plan view of the total money value indicator shown at the top of Figs. 1 and 2;

Fig. 40 is a plan view of the levers and operating mechanism controlled by the banks of keys corresponding to unit and decimal cent values, the same being shown in their normal or neutral position;

Fig. 40ª is a detail side elevation of a portion shown in Fig. 40;

Fig. 41 is a plan view of certain of the levers and operating mechanism shown in Fig. 40, when moved upon manipulation of the "2" key in the decimal cent value and the "5" key in unit cent value, giving the money value of 25 cents;

Fig. 42 is a plan view of certain of the levers shown in Fig. 40 when operated after manipulation of the "3" key in decimal cent value and the "5" key in unit cent value, giving the monetary value of 35 cents;

Fig. 43 is a plan view of certain of the levers shown in Fig. 40 when operated after manipulation of the "4" key in decimal cent value and the "5" in unit cent value, giving the monetary value of 45 cents;

Fig. 44 is a plan view of the levers and operating mechanism controlled by the keys corresponding to unit and decimal dollar values;

Fig. 45 is an enlarged detail view in front elevation of the right hand uppermost portion shown in Fig. 2, showing the individual penny, nickel, and dime single denomination indicators and the individual penny, nickel and dime total denomination indicators;

Fig. 46 is an enlarged detail view in front elevation of the middle uppermost portion of Fig. 2, showing the individual quarter, half-dollar and dollar single denomination indicators, the individual quarter, half-dollar and dollar total denomination indicator; and the total money value indicator;

Fig. 47 is an enlarged detail view in front elevation of the left hand uppermost portion of Fig. 2, showing the individual two dollar, five dollar and ten dollar total denomination indicators;

Fig. 48 is a detail view in side elevation on the line 48—48 of Fig. 46, viewed in the direction of the indicating arrows; Fig. 49 is a detail view taken on the line 49—49 of Fig. 45, as seen in the direction of the indicating arrows; Fig. 50 is an enlarged detail view of a portion of the operating mechanism of a total denomination indicator shown at the middle of Fig. 49.

Figure 52:
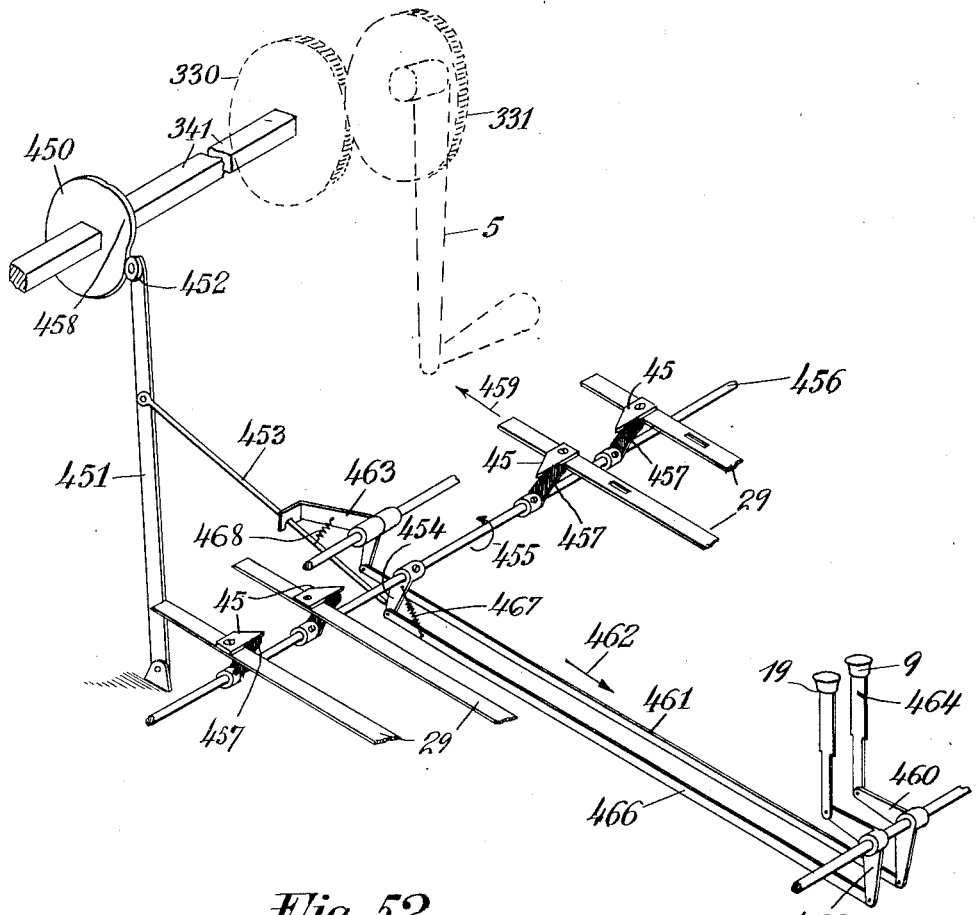

Fig. 51 is a detail view on an enlarged scale in sectional elevation taken on the line 51—51 of Fig. 45, as seen in the direction of the indicating arrows;

Fig. 52 is a detail view on an enlarged scale showing the "error" key and mechanism operated thereby; also the "repeat" key and control parts permitting any given monetary value to be repeated; and Figs. 53 and 54 are details on lines 53—53 and 54—54 of Fig. 39 in the direction of the respective arrows.

The particular denominator machine illustrated comprises in general a forward portion 1 and of relatively less height and a rearward portion 2 extending upwardly from said forward portion 1 and of relatively greater height. The keys of the machine are arranged in banks corresponding respectively to unit cent values, decimal cent values, unit dollar values and decimal dollar values. Such four banks of keys are arranged in alignment before the operator when the operator stands in front of the forward portion 1 of the machine. Excepting the decimal dollar value keys, each bank comprises nine keys, arranged numerically in order; the decimal dollar bank of keys comprises five keys also arranged numerically in order. For convenience, the "error" and "repeat" keys are disposed between the bank of decimal cent value keys and the bank of unit dollar value keys. The rearward portion 2 of the machine comprises a lowermost horizontal series 3 of single denomination indicators, respectively indicating the penny, nickel, dime, quarter, half-dollar specie, and one dollar, two dollar, five dollar and ten dollar bills or equivaent.

The rearward portion 2 of the machine further comprises an upper horizontally arranged series 4 of total denomination indicators of the same fractional currency and bill values as in the lowermost or single denomination series. The respective indicators of the total denomination series 4 are actuated by means of the crank handle 5 of the transfer arrangement subsequent to the manipulation of the keys for any given momentary value.

Let us assume the keys of the denominator machine to be now manipulated for the monetary value of $18.91, and further assume that the machine, including the transfer arrangement, to have been operated for the monetary value of $27.89. The depression of the proper keys for the value of $18.91 will cause the indication of "1" on each of the indicators of the single denomination series 3. By turning the handle 5 of the transfer arrangement in clockwise direction, from its neutral position 5ª to its position shown in the Fig. 1, the indicators of the total denomination series 4 will now indicate the respective sums of the denominations of the two assumed monetary values, namely—

$10. $5. $2. $1. 50¢ 25¢ 10¢ 5¢ 1¢
3    2   2   1   2    2    2    1   5 and the total money value indicator 6 will indicate the sum of the two assumed monetary values, namely—

00046 80

By continuing the clockwise rotation of handle 5 to its neutral position 5ª, the indicators of the single denomination series 3 will be automatically restored to "0" reading, while the corresponding depressed keys will be automatically restored to their normal positions, and thus placing the machine ready for the next operation, let us assume that the third monetary value is the same as the second monetary value, namely $18.91. In manipulating the machine for the indication of the first occurrence of the monetary value of $18.91, as explained above, the "repeat" key 9 is manipulated before turning the handle of the transfer mechanism, and thus causing the maintaining of the single denomination series 3, and the continued depression of the corresponding manipulated keys when the handle is rotated from the position indicated in Fig. 1 to its neutral position 5ª. Upon continued clockwise rotation of handle 5 to complete another or second full turn, the monetary value $18.91 is transferred and added a second time to the total denomination series 4 and the total money value indicator 6.

In the event that any wrong key or keys have been manipulated, there is provided an "error" key 19, which when manipulated restores such wrong key or keys to neutral position.

As will be apparent from Figs. 2 and 3, there is arranged in the forward portion 1 below the keys of the aforesaid four banks of keys suitable mechanism controlled thereby, whereby upon manipulation of the proper keys any certain monetary value is analysed into the proper single denominations and the respective number of the same which make up the minimum number of specie and bills totaling the said certain monetary value. However, for the particular uses to which the denominator machine illustrated has been designed, it has been deemed expedient not to provide indicators for twenty-dollar bills, or bills of higher denomination, nor for $2.50 gold pieces, or gold coins of denomination higher than $10.

In addition to the above general provisions, the illustrated denominator machine is equipped with a resetting arrangement manipulated by the milled head 7 for resetting the individual indicators of the total denomination series 4 to "0," and also with a resetting arrangement operated by means of the milled head 8 for resetting the total money value indicator 6 to "0."

We shall now consider in detail the above described general portions of the illustrated denominator machine under the following headings:

Key-board. Analysis mechanism. Single denomination series of indicators. Mechanism of total denomination series of indicators. Synthesis and adding mechanism for total money value indicator.

*Key-board.*—The key-board is shown generally in Figs. 1 and 2 and more particularly in Figs. 4 to 37 inclusive. In general, each bank of keys is mounted as a unit on a frame 10 having feet 11, 11, at the extreme ends, the frame 10 being open at the bottom to permit the levers and other parts of the analysis mechanism to protrude under the said frame 10, see Figs. 4 to 9 and 15. The frames 10 of the four banks of keys are mounted on the base 12 of the forward portion 1 of the machine, as by screws passing through openings in the feet 11 of frame 10. Transverse to the frames 10 and also supported on the base 12, are arranged spaced supporting strips 13 and shown as four in number. Between the unit cent bank of keys and the decimal cent bank of keys is positioned a plate 14 secured by screws or the like to the transverse supporting strips 13. A similar plate 15 is disposed between the unit dollar bank of keys and the decimal dollar bank of keys, and similarly carried by the transverse supporting strips 13. The plates 14 and 15 serve to hold the keys of the key-board in uniform position relative to the base 12 of the forward portion 1 of the denominator machine, as will be more fully described hereinafter. Additional plates parallel to plates 14, 15 are arranged across the supporting strips 13 to support or serve as the top or cover of the forward portion 1 of the machine. If desired, the plates 14, 15 and the said additional plates parallel thereto may be made integral, that is as a single plate.

The keys of the various banks of keys are of substantially the same construction to thereby facilitate adjustment and secure economy in construction and assembling. Referring particularly to Figs. 5 and 6, for example, each key comprises a stem 20 having a reduced upper portion 21 adapted to receive a cap bearing its proper number designation. On opposite sides (Fig. 15) of the stem 20 are provided a lower triangular projection 22 having a base 23 of predetermined width and an altitude 24 of a certain length, and also an upper triangular projection 25, in reverse position to that of the projection 22. The base 26 of triangular projection 25 is substantially equal to the base 23 of projection 22, but the altitude 27 of projection 25 is greater than altitude 24 of projection 22; in the specific form illustrated the altitude 27 is about twice the altitude 24. As will be seen from Figs. 6 and 15, the lower projection 22 normally is positioned within the opening 28 of upper slide bar 29, the latter extending longitudinally at the top of frame 10. The slide bar 30 is disposed below and parallel to the slide bar 29. Normally the slide bars 29 and 30 are held against the stop 31 by suitable tension means, such as the respective springs 32, 33.

The normal position of each key is determined by a stop 34 disposed towards the top of each stem 20, said stop 34 cooperating with plate 14, in the case of the banks of keys of unit cent and decimal cent values, and in cooperation with plate 15, in the case of the keys of the banks of unit dollar and decimal dollar values. Each stem 20 of the keys is also provided with an abutment 35 for receiving an end of a coil spring 36, the other end 37 of spring 36 being passed through a rod 38 carried by the transverse supporting plates 13 and at right angles thereto (see Fig. 5); specifically, the four rods 38 each pass through openings in a flange 39 on the lower side of the respective transverse supporting plates 13. This construction is advantageous since the upper ends of the springs 36 in any bank of keys are successively threaded by pushing its rod 38 therethrough.

Taking the bank of unit cent values as an illustration, as shown in Fig. 6, and comparing said figure with Figs. 15 and 16, it will be seen that as any key, say key "1" is being pushed downwardly, the projection 22 passes out of the opening 28 in slide 29 into and through opening 40 of lower slide 30. As this movement progresses, the lower edge of projection 25 encounters the edge 41 of upper slide 29 causing slide 29 to move gradually to the right. The lower edge of projection 25 in this movement also encounters the edge 42 of lower slide 30 causing slide 30 to also move to the right. When the edge 26 of projection 25 is below the upper slide 29, by action of its spring 32 the slide 29 is moved to the left and the key becomes held in locked position by the edge 26 of projection 25 being caught below upper slide 29, while the lower slide 30 is maintained in its extreme right hand position, causing the edges 43 of the openings 40 of the lower slide 30 to be held under the projection 22 of the other keys belonging to the same bank, thereby locking said other keys of the same bank and thus preventing any of said other keys from being depressed or otherwise manipulated, as is shown in Fig. 16. In the specific construction illustrated, the upper projection 25 begins on a line approximately coincident with the apex of lower projection 22. The opening 28 is chosen of such length as to provide a proper clearance to allow projection 25 to pass through opening 28, whereby the edges 44 of openings 28 will not encounter the projection 22 of the remaining keys of the same bank.

It will be noted that the depressed key is positively limited in its downward movement of operation by its projection 22 encountering the plate, appearing in Fig. 16, positioned below and in substantial parallelism to the slides 29, 30. Such positive limitation of the extent of manipulative movement of each key is also attained by the provision of the oppositely disposed right angled notches on each stem 20 of the keys, coacting with a suitable plate (not shown) having a slot through which the reduced portion of each key stem 20 extends. As shown, such projections 22 of the respective keys are positioned at substantially the same location, i. e., in substantial alignment, when the keys are in their upper or undepressed positions and disposed at substantially equal distances from the plate 52, thereby providing for the uniform extent of operation or manipulation of the keys of the key-board, as referred to hereinafter.

As will be more fully explained hereinafter when the crank handle 5 is operated to transfer the indications from the single denomination series 3 of indicators to the total denomination series 4 of indicators, mechanism is provided to normally engage the release member 45 carried by the upper slide bar 29, whereupon such movement of each bar 29 to the right moves the slot or opening 28 to the right, permitting the projection 25 of such depressed key to rise under action of the spring 36 to its neutral position.

At or near the lower end of each key is provided an extension or projection 46 adapted to positively engage one or more bell cranks or equivalent means for actuating the "analysis" mechanism. In the specific embodiment illustrated, I have employed bell crank levers of substantially the same form and dimensions wherever employed in my denominator machine, excepting that certain bell crank levers, as more particularly described hereinafter, are provided with additional means, such as forks, constructed to receive and actuate certain parts of the "analysis" mechanism. The employment of bell crank levers, pivotally mounted on the frame 10, is for the purpose of securing the transmission of orthogonal movement from the keys to the "analysis" mechanism.

For the purpose of securing a highly sensitive touch, I prefer to give an equal depression stroke to the keys of the key-board, and to compensate for unequal mvements of the parts actuated by the keys, as will be explained hereinafter.

It will be noted that the preferred form of the invention illustrated in the drawings embodies keys in the several banks numbered beginning with "1" and ending with "9", and that no "0" key is employed. In the claims I have employed the expression "to solely single unit numbers" or similar expressions to connote that the key-board defined thereby comprises keys solely corresponding to values beginning with 1 and ending with 9 for the respective unit cent, decimal cent, unit dollar and other banks or sets of keys, thereby avoiding the need of keys corresponding to double or triple or other multiple numbers. Such expression also connotes that no zero key is included in the respective banks and that the mechanism operated by the keys effects the desired actuation without the operation or manipulation of any such zero key.

*Unit cent bank of keys.*—This bank of keys comprises nine keys numbered successively from "1" to "9" inclusive. For the purposes of simplification in construction and for other considerations, the bell crank levers of these nine keys are assembled into three groups to wit, the first group comprising the bell crank levers operated by keys "1", "2", "6" and "7", the second comprising the bell crank levers operated by keys "3", "4", "8" and "9", and the third comprising bell crank levers operated by keys "5", "6", "7", "8" and "9".

Such arrangement of grouping the bell crank levers is chiefly for the object of reducing the number of the operating levers and other parts of the "analysis" mechanism to the lowest possible minimum, as will be more fully set forth hereinafter.

Referring now to the first group (see Fig.

10) key "2" is provided with the projection 46 adapted to engage the arm 47 of bell crank lever 48. Such arrangement secures a uni-directional connection between the key and its corresponding bell crank lever. The lower end of bell crank lever 48 is provided with the fork 49 adapted to embrace the neck 50 of lever 51 of the "analysis" mechanism controlling the penny indicator of the single denomination series 3 (see Fig. 40). Key "1" is provided with a similar projection 46 adapted to engage arm 53 of bell crank lever 54, the lower arm of bell crank lever 54 being connected by a rod 55 to bell crank lever 48. Normally, the rod 55 is held in its extreme right hand position as indicated in Fig. 10, by the spring 52 or other tension element (see Fig. 7) extending from a fixed point of frame 10 to a suitable lug on bar 55. Thus, upon actuation of either key "1" or "2", the lever 51 (Fig. 40) is forced to move the slotted link 56 upwardly and thereby push pin 57 upwardly. The pin 57 is affixed to the rod 58 slidably mounted on the lower side of base 12 of front portion 1 of the machine and controls the movable dial of the penny indicator. For the purpose of attaining the desired indications by the dial of the penny indicator of the single denomination series 3, corresponding to keys "1", "2", "6", and "7", and by keys having the same depression stroke, as stated above, the bell crank levers 54 and 48 are connected by rod 55 to corresponding bell crank levers actuated respectively by keys "6" and "7". Such connection is effected by positioning the connecting points 59 and 60 so that the distance between said connecting points 59 and 60 exceeds the distance between the oscillating pivots of bell crank levers 48 and 54 by such amount that the depression stroke of key "1" imparts to the fork 49 a stroke approximately one-half the stroke imparted upon the depression stroke of key "2" which depression stroke is equal to the depression stroke of key "1". The bell crank lever of key "6" is arranged relative to the bell crank lever of key "7" similar to the relation of bell crank lever 54 to bell crank lever 48.

Accordingly, in normal position, the bottom of the socket 61 of bell crank lever 48 is substantially in contact with projection 46 of key "2", and the bottom of socket 62 of bell crank lever 54 is normally spaced at a predetermined distance below the projection 46 of key "1". Now, when key "2" is depressed, the fork 49, lever 51 and rod 58 are given a stroke producing the indication "2" on the penny indicator of single denomination series 3. However, when key "1" is depressed the fork 49, lever 51 and rod 58 are given a stroke of less length producing the indication "1" on the said penny indicator.

Similarly, the keys "3" and "4" (see Fig. 11) are arranged with respect to their respective bell crank levers 65, 66, as in the arrangement of keys "1" and "2" to their respective bell crank levers 54 and 48. Specifically, the bell cranks 65, 66, are respectively connected at 67, 68 to the rod 69 extending longitudinally of the frame 10 and pivotally connected to bell crank 92–3 provided with the fork 71 and to bell crank lever 93–4. Accordingly, upon depressing key "3" to turn bell crank lever 65, the bar 69 is moved to the left (Fig. 11) thereby moving the lever 73 of the "analysis" mechanism (Fig. 40) to produce the indication "3" on the dial of the penny indicator of the single denomination series 3. When key "4" is depressed, the bell crank lever 66 is oscillated, thereby moving bar 69 to the left and also fork 71 to the left (Fig. 11), and the lever 73 to produce the indication "4" on the dial of the penny indicator of the single denomination series.

The key "5" of the unit cent bank of keys (Fig. 12) is positioned so that its extension 46 engages bell crank lever 80 carrying at its lower end the fork 81. The fork 81 is adapted to operatively engage the cut-away neck 82 (Fig. 40) of lever 83 of the "analysis" mechanism controlling the rod 87 of the nickel indicator of the single denomination series 3. As shown and as hereinafter set forth the lever 83 is provided with arm 84 movably mounted thereon and normally held by the spring 85 in engagement with the pin 86 fixed to the nickel rod 87, said pin 86 passing through the slot in the base 12 of the machine, as aforesaid and positively limiting the extent of movement of the nickle denomination rod 87. Accordingly, assuming key "5" to be the sole manipulated key of the unit and decimal cent banks of keys, for reasons set forth hereinafter, the lever 83 will be moved to produce the indication "1" on the movable dial of the nickel indicator of the single denomination series 3.

Since the value of the six cents calls for one penny and one nickel, key "6" (Fig. 13) is provided with two bell crank levers 90–1 and 90–5 (see Figs. 10 and 12), respectively serving to actuate said fork 49 and said fork 81, respectively controlling the penny and nickel indicators of the single denomination series 3. Thus, upon depression of key "6", the fork 49 and thereby the lever 51 is moved to produce the indication "1" on the penny indicator of the single denomination series 3 and the fork 81 is moved to produce the indication "1" on the nickel indicator of the single denomination series 3. It will be noted that key "6" is related to its bell crank 90–1 in the same manner as key "1" is to its bell crank lever 54, and that key "6" is related to its bell crank lever 90–5 the same as key "5" is to its bell crank lever 80. In a like manner, key "7" (Fig. 13) is provided with two bell crank levers 91-2 and 91-5, key "7" being related to its bell crank lever 91-2 the same as key "2" is to its bell crank lever 48, and key "7" is related to its bell crank lever 91-5 the same as key 5 is to its bell crank lever 80. Accordingly, upon depressing said key "7" the lever 51 (see Fig. 40) is moved to produce the indication "2" on the penny indicator of single denomination series 3, and the lever 83 is also moved to produce the indication "1" on the nickel indicator of single denomination series 3.

Key "8" is similarly provided with two bell crank levers 92-3 and 92-5 respectively controlling fork 71 and fork 81; key "8" is related to its bell crank lever 92-3 similar to key "3" to its bell crank lever 65, and key "8" is related to bell crank lever 92-5 the same as key "5" is to its bell crank lever 80. Accordingly when key "8" is depressed, the lever 73 and lever 83 of the "analysis" mechanism (Fig. 40) are moved to respectively produce the indication "3" on the penny indicator and to produce the indication "1" on the nickel indicator of the single denomination series. Similarly, key "9" is provided with two bell crank levers, one designated 93-4 and controlling fork 71, the other designated 93-5 and controlling fork 81, said bell crank levers respectively corresponding to the bell crank levers of keys "4" and "5". The depression of key "9" moves the fork 71 (Fig. 11) and fork 81 to produce the indication "4" on the penny indicator of a single denomination series 3 and the indication "1" on the nickel indicator of single denomination series 3.

*Decimal cent bank of keys.*—The bank of keys is the second bank shown on the right hand side of Figs. 1 and 2, and to the left of the unit bank of keys. The decimal cent bank also contains keys numbered from "1" to "9". Each key per se of this bank is the same as each key of the bank of unit cent values. Similarly, each key of the decimal cent values is provided with one or more bell crank levers, as the case may be, for controlling the proper levers of the "analysis" mechanism, and thereby produce the desired indication or indications on the dials of the proper indicators of the single denomination series 3. Referring to Fig. 18, key "1" controls the bell crank lever 100 provided with the fork 101 adapted to engage the head 102 of lever 103, whereby upon depression of key "1" the rod 106 controlling the movable dial of the dime indicator produces the indication "1". Similarly, key "2" controls the bell crank lever 107 pivotally connected by bar 108 to bell crank lever 109 provided with the fork 110, the latter being adapted to engage the head 111 of lever 112 (Fig. 40.). Accordingly, upon depression of key "2" the fork 110 moves the lever 112 and the rod 106 thereby producing the indication "2" on the dial of the dime indicator.

Key "3" is provided with a bell crank lever 116 having the fork 117 adapted to engage the head 118 of lever 119, controlling the rod 124 of the quarter indicator and rod 87 of the nickel indicator of the single denomination series 3. As set forth hereinafter, the main lever 119 is provided with the arm 125, movably mounted thereon and normally held by the spring 126 in engagement with the pin 127 fixed to the nickel rod 87, said pin 127 projecting through the slot in the base 12 of the machine and positively limiting the extent of movement of the nickel rod 87. Upon depression of key "3" the lever 119 is moved to produce the indication "1" on the dial of the quarter indicator and the indication "1" on the dial of the nickel indicator.

Key "4" (Fig. 21) is provided with the bell crank lever 128 pivotally connected by bar 129 to bell crank 130-4 provided with the fork 131, the latter being adapted to engage the head 132 of lever 133 of the "analysis" mechanism (Fig. 40) controlling rod 124 of the quarter indicator, rod 106 of the dime indicator and rod 87 of the nickel indicator. Accordingly, upon depression of key "4" the lever 133 is moved to produce the indication "1" on the respective dials of the quarter, dime and nickel indicators of the single denomination series 3. As set forth hereinafter, the pin 137 fixed to the quarter rod 124, the pin 141 fixed to the dime rod 106 and the pin 147 fixed to the nickel rod 87 project respectively through slots in the base 12, of the machine and positively limit the extent of actuation of the respective rods.

Key "5" is similarly provided with the bell crank lever 150 (Fig. 22) said bell crank lever 150 having the fork 151 adapted to engage the head 152 of lever 153 (Figs. 2, and 43). The lever 153 controls rod 156 controlling the movable dial of the fifty cent indicator of the single denomination series 3. As set forth hereinafter, the lever 153 is provided with the arm 154, movably mounted thereon and engaging the pin 153 fixed on the half-dollar rod 156, said pin 153 projecting through the slot in the base 12 of the machine and positively limiting the extent of movement of the half-dollar rod 156. Thus upon depression of the key "5" the lever 153 is moved to actuate the rod 156 to produce the indication "1" on the fifty cent indicator.

Keys "6", "7", "8" and "9" of the decimal cent values are each provided with two bell crank levers similar to the double bell crank levers provided for the corresponding keys of the unit cent bank of keys. Specifically, the key "6" of the decimal cent values controls the bell crank levers 158–1 and 158–5, the bell crank lever 158–1 being pivotally connected by rod 159 (Figs. 18 and 23) to bell crank lever 100 having the fork 101; the bell crank lever 158–5 is pivotally connected by rod 160 (Figs. 22 and 23) to bell crank lever 150 having fork 151. Accordingly, when key "6" is depressed, the forks 101 and 151 respectively actuate lever 103 and lever 153 to produce the indication "1" on the dime and fifty cent indicators.

Key "7" is similarly provided with bell crank lever 109–2 (Figs. 19 and 24) and bell crank lever 109–5 (Fig. 22) respectively controlling fork 110 and fork 151, whereby the levers 112 and 153 of the "analysis" mechanism (Fig. 40) are moved to respectively produce the indication "2" on the dime indicator and the indication "1" on the fifty cent indicator.

In like manner, key "8" is provided with two bell crank levers, one designated 161–3 controlling fork 117 by means of rod 162 (Figs. 20 and 25) the other being designated 161–5 controlling fork 151 by rod 160 (Figs. 22 and 25). Accordingly when key "8" is depressed, the respective forks 117 and 151 actuate lever 119 and lever 153, whereby to produce the indication "1" on each of the fifty cent, quarter and nickel indicators.

Key "9" is similarly provided with two bell crank levers 130–4 and 130–5 respectively controlling levers 133 and 153 (Figs. 21, 22 and 26). Thus, upon depression of key "9" levers 133 and 153 are moved to produce the indication "1" on each of the fifty cent, quarter, dime and nickel indicators. (See Fig. 40.)

*Unit dollar bank of keys.*—Figs. 27 to 36, inclusive, relate to the banks of keys coreponding to unit dollar values. In general, this bank of keys is similar to each of the banks of keys of unit and decimal cent values and also comprises keys indicated from "1" to "9" inclusive.

Key "1" is mounted on the frame 10 to control the bell crank lever 189 by means of the extension 46 of said key. The bell crank lever 189 is provided with the fork 161 adapted to engage the head 162 (Fig. 44) of lever 163 controlling the rod 166 adapted to actuate the movable dial of the dollar indicator of the single denomination series 3. The bell crank lever 189 is pivotally connected to the rod 167 extending longitudinally of frame 10, and is normally held in its right hand extreme position, as indicated in Fig. 28, by suitable tension means such as spring 168 (Fig. 27). Upon depression of key "1" the lever 163 is moved to actuate rod 166 to thereby produce the indication "1" on the movable dial of the one dollar indicator.

Key "2" controls the bell crank lever 169 provided with the fork 170, said fork 170 being adapted to receive the head 171 of lever 172 (Fig. 44), the rod 175 in turn controlling the movable dial of the two-dollar indicator. The bell crank lever 169 is pivotally connected to the longitudinally extending bar 176 held normally in the position indicated in Fig. 29, by its spring 177. When key "2" is depressed, the lever 172 is moved to produce the indication "1" on the two-dollar indicator.

Key "3" is provided with two bell crank levers, one designated 178–2, (Figs. 29 and 30) pivotally connected by rod 176 to said bell crank lever 169; the other bell crank lever being designated 178–1 is pivotally connected by rod 167 to bell crank lever 189. Accordingly, upon depression of key "3" the rod 166 controlling the one-dollar indicator and the rod 175 controlling the two-dollar indicator will be actuated to each produce the indication "1" on the one-dollar and the two-dollar indicators of the single denomination series 3.

Key "4" controls the bell crank lever 181 connected by rod 182 to bell crank 183–4 having the fork 184, said fork 184 being adapted to receive the head 185 of lever 186 controlling rod 175 in turn controlling the two-dollar indicator (Fig. 44). Upon depression of key "4" thereby actuating fork 184, (Fig. 31) the lever 186 will produce the indication "2" on the movable dial of the two-dollar indicator.

Key "5" controls the bell crank lever 190 (Fig. 32) having the fork 191, said fork 191 being adapted to receive the head 192 (Fig. 44) of lever 193, controlling the rod 196 in turn controlling the movable dial of the five-dollar indicator of the single denomination series 3.

Accordingly upon depression of key "5" the lever 193 is moved to produce the indication "1" on the said five-dollar indicator.

Key "6" is provided with two bell crank levers 197–1 and 197–5 (Figs. 32, 33 and 28) said bell crank lever 179–1 operating the fork 161 thereby controlling the lever 163 to produce the indication "1" on the one-dollar indicator. The bell crank lever 197–5 (Fig. 32) is pivotally connected by rod 198 to bell crank lever 190 having the fork 191 thereby controlling lever 193 to produce the indication "1" on the five-dollar indicator.

Similarly, key "7" is provided with two bell crank levers, one designated 199–2 (Figs. 32 and 34) the other designated 199–5 pivotally connected by rod 198 to bell crank lever 190 controlling lever 193. Accordingly, upon depression of key "7" the lever 172 and lever 193 are moved to respectively produce the indication "1" on the two dollar indicator, and the indication "1" on the five-dollar indicator.

Key "8" is provided with three bell crank levers (Fig. 27) one being designated 200–1 connected by rod 167 to bell crank lever 189 controlling the rod 166 (Fig. 44) of the one-dollar indicator: another bell crank lever 200-2 (Fig. 29) connected by rod 176 to bell crank lever 169 controlling rod 175 of the two-dollar indicator: and the other bell crank lever designated 200-5 (Fig. 32) connected by rod 198 to bell crank lever 190, controlling the rod 196 of the five dollar indicator. Accordingly, upon depression of key "8" the said three bell crank levers are simultaneously actuated thereby producing the indication "1" on each of the one-dollar indicator, the two-dollar indicator and the five-dollar indicator.

Key "9" (Figs. 27 and 36) is provided with two bell crank levers, one designated 183-4 and the other 183-5 (Fig. 32). Bell crank lever 183-4 is provided with fork 184 as above described, controlling the lever 186, thereby controlling rod 175 of the two dollar indicator, and the bell crank lever 183-5 (Fig. 32) is connected by rod 198 to bell crank lever 190 controlling the rod 196 of the five-dollar indicator.

Accordingly, upon depression of key "9" the rods 175 and 196 are respectively actuated to produce the indication "2" on the two-dollar indicator and the indication "1" on the five-dollar indicator.

The particular type of denominator machine illustrated, is designed for use in which the maximum wage or other monetary value does not exceed the sum of $59.99 and accordingly the decimal dollar bank of keys is shown as comprising five keys numbered respectively "1", "2", "3", "4", and "5". Of course, if it is desired to add keys representing greater values, such keys will be arranged similar to the keys shown and described, proper connection with the "analysis" mechanism being made in conformity to the monetary values represented by such additional keys.

Referring to Figs. 37 and 38, it will be noted that key "1" controls the bell crank lever 210, pivotally counted in the frame 10, said bell crank lever 210 being connected by the link 211 to bell crank lever 212 having the fork 213. The link 211 is maintained in the position indicated in Fig. 38 by the tension means 214 extending from said link 211 to a fixed point on the frame 10 (Fig. 37). The fork 210 controls the lever 215 of the "analysis" mechanism (Fig. 44), and thereby the rod 219 of the ten dollar indicator. The lever 215 has the head 216 adapted to be embraced by the fork 213. Thus upon depression of key "1", the fork 213 is given a stroke whereby lever 215 actuates rod 219 to produce the indication "1" on the movable dial of the ten-dollar indicator.

Key "2" controls the bell crank lever 212 having the said fork 213. Bell crank levers 210 and 212 are mounted with respect to the link 211 so that the distance of the connection point 220 to the connection point 221 is greater than the distance between the oscillating points of bell crank levers 210 and 212.

Accordingly, the effective stroke imparted to fork 213 upon the depression stroke of key "2" is substantially twice that imparted upon the depression stroke of key "1". Thus, when key "2" is depressed, the lever 215 is moved to actuate rod 219 to produce the indication "2" on the movable dial of the ten-dollar indicator.

Key "3" controls the bell crank lever 222 pivotally connected by link 223 to bell crank lever 224 having the fork 225. (Fig. 38.) The fork 225 is adapted to embrace the head 226 of member 227, controlling the rod 219 of the ten-dollar indicator. (Fig. 44.) Upon depression of key 3, the rod 225 is moved to produce the indication "3" on the movable dial of the ten-dollar indicator.

Key "4" controls the bell crank lever 230 connected by link 223 to the bell crank 224 having the fork 225. The depression of key "4" actuates the fork 225 (Fig. 38) a distance whereby the lever 227 is moved to produce the indication "4" on the ten-dollar indicator.

Key "5" directly controls the bell crank lever 224 and the depression of key "5" imparts to the lever 227 a stroke to produce the indication "5" on the ten-dollar indicator. To effect the desired three different strokes of the fork 225, when keys "3", "4" and "5" are given the same depression stroke, for the reasons above stated, the connecting points 231 and 235 are spaced from each other a distance greater than the distance between the oscillating points of bell crank levers 224 and 222, as in similar instances hereinbefore mentioned, and the connection of bell crank lever 230 with the link 223 is effected by means of the pin 232 sliding in the slot 236 of suitable length.

Whereas I have described one specific arrangement of key-board, locking and release mechanism and parts controlled by the key-board to produce the desired orthogonal transmission of movement, it will be understood, that other suitable arrangement may be devised or employed, to obtain these objects of my invention.

*Analysis mechanism.*— The "analysis" mechanism comprises in general main levers actuated by the keys of the key-board and controlling the rods and other parts for effecting the indications on the dials of the indicators. As will be apparent from the above description of the key-board, certain of these main levers have a plurality of strokes corresponding to a plurality of indications. In the above description of the operations of these main levers, it has been assumed that but one key is operated. When a key of any bank is operated and a key of another bank is operated, and more specifically when a key of the unit cent bank and a key of the decimal cent bank are operated, provision is made for interconnecting the main levers corresponding to certain of the keys of the unit and decimal cent values, whereby the operation of the parts controlled by certain of these main levers is modified by the operation of the parts controlled by other of these main levers, as will be explained hereinafter.

I will now describe the particular parts, controlled by the respective main levers referred to above, these main levers being taken in the order of the numerical value of the keys of the several banks.

*Main levers of unit cent values.*—Keys "1", "2", "6" and "7" control main lever 51 having the two strokes indicated by the position lines 51–1 and 51–2. The lever 51 is pivotally supported on the board 12, and is provided at one end with the neck 50 by means of which it is actuated. At the other end, lever 51 is pivotally connected to slotted link 56 receiving the pin 57 in fixed relation to the rod 58 of the penny indicator. Accordingly, the rod 58 will assume positions relative to the respective position lines 51–1 and 51–2. Keys "3", "4", "8" and "9" control main lever 73 having the two strokes indicated by the position lines 73–3 and 73–4. The lever 73 is similar to lever 51 and controls the slotted link 76 receiving the pin 77 in fixed relation to rod 58. Accordingly, the rod 58 will assume positions relative to the respective position lines 73–3 and 73–4.

Keys "5", "6", "7", "8" and "9" control main lever 83 having a single stroke indicated by position line 83–5. The lever 83 is provided with the neck 82 at one end by means of which it is actuated. At the other end is pivotally connected to the angle lever 84 held in the normal position shown in Fig. 40 by the spring 85 and controlling the pin 86 in fixed relation to the rod 87 of the nickel indicator.

To illustrate the operation of these parts, let us assume that key "2" is now manipulated. Such operation will cause lever 51 to assume the position 51–2, moving the rod 58 to effect the indication "2" on the penny indicator. Again, assume that key "8" is operated. Such operation will cause lever 73 to assume the position 73–3 moving the rod 58 to effect the indication "3" on the penny indication, and lever 83 to assume the position 83–5 moving the rod 87 to effect the indicator "1" on the nickel indicator.

*Main levers of decimal cent values.*—Keys "1" and "6" operate main lever 103, similar to lever 51, and control the slotted link 104 receiving the pin 105 in fixed relation to the rod 106 of the dime indicator. The lever 103 has but the single stroke indicated by position line 103–1. Keys "2" and "7" operate main lever 112 having the single stroke indicated by position line 112–2. The lever 112 is provided with the neck 111 at one end by means of which it is actuated, and at the other end is pivotally connected to the angle lever 113 held in the normal position indicated in Fig. 40 by the spring 114, and controlling the pin 115 in fixed relation to the rod 106 of the dime indicator.

Keys "3" and "8" control main lever 119 having the single stroke indicated by the position line 119–3. The lever 119 is provided at one end with the neck 118 by means of which it is actuated, and at the same end is pivotally connected to lever 121 by means of link 120, and thereby controls slotted link 122 receiving the pin 123 in fixed relation to the rod 124 of the quarter indicator. At its other end, the lever 119 is pivotally connected to angle lever 125 held in the normal position shown in Fig. 40 by the spring 126, and controlling the pin 127 in fixed relation to the rod 87 of the nickel indicator.

Keys "4" and "9" operate main lever 133 having the single stroke indicated by the position line 133–4. The lever 133 is provided at one end with the neck 132 by means of which it is actuated, and at the same end is pivotally connected to lever 135 by means of link 134, and thereby controls slotted link 136 receiving pin 137 in fixed relation to the rod 124 of the quarter indicator. Adjacent the same end, the lever 133 is pivotally connected to lever 139 by means of link 138 and thereby controls slotted link 140 receiving the pin 141 in fixed relation to the rod 106 of the dime indicator. At its other end, the lever 133 is pivotally connected to angle lever 145 held in the normal position indicated in Fig. 40 by the spring 146, and controlling the pin 147 in fixed relation to the rod 87 of the nickel indicator.

Keys "5", "6", "7", "8" and "9" operate main lever 153 having the single stroke indicated by position line 153–5, similar to the main lever 51, controlling the slotted link 154 (Fig. 43) receiving the pin 155 in fixed relation to the rod 156 of the fifty-cent indicator.

To illustrate the operation of these parts, let us assume that decimal cent key "9" is now manipulated. Such operation will cause lever 133 to assume the position 133–4, moving the rod 87 to effect the indication "1" on the nickel indicator; and causing lever 139 to move rod 106 to effect the indication "1" on the dime indicator; and also causing lever 135 to move rod 124 to effect the indication "1" on the quarter indicator. Such operation of key "9" will also cause main lever 153 to assume the position line 153–5 moving the rod 156 to effect the indication "1" on the fifty cent indicator.

*Main levers of unit dollar value.*—Keys "1," "3," "6," and "8" operate main lever 163 having the single stroke indicated by positioning line 163–1 (Fig. 44). The lever 163 is provided at one end with the neck 162 by means of which it is actuated, and at the other end is pivotally connected to the slotted link 164 receiving pin 165 in fixed relation to rod 166 of the one-dollar indicator.

Keys "2", "3", "7" and "8" operate lever 172 having the single stroke indicated by the position line 172–2. The lever 172 is provided with the neck 171 at one end, and at the other end is pivotally connected to slotted link 173, receiving the pin 174 in fixed relation to rod 175 of the two-dollar indicator.

Keys "4" and "9" operate main lever 186 having the single stroke indicated by position line 186–4. The lever 186 is provided at one end with the neck 185, and at the other end is pivotally connected to slotted link 187 receiving the pin 188 in fixed relation to the rod 175 of the two-dollar indicator.

Keys "5", "6", "7", "8" and "9" operate main lever 193 having the single stroke indicated by position line 193–5. Lever 193 is provided at one end with the neck 192, and at the other end is pivotally connected to the slotted link 194 receiving the pin 195 in fixed relation to the rod 196 of the five-dollar indicator.

To illustrate the operation of these parts, let us assume that key "8" is manipulated. Such operation will cause lever 163 to move rod 166 to effect the indication "1" on the one-dollar indicator; also, will cause lever 172 to move rod 175 to effect the indication "1" on the two-dollar indicator; and also will cause lever 193 to move rod 196 to effect the indication "1" on the five-dollar indicator.

*Main levers of the decimal dollar values.*— Keys "1" and "2" operate main lever 215 having the two strokes indicated by the position lines 215–1 and 215–2. The lever 215 is provided at one end with the neck 216, and at the other end is pivotally connected to slotted link 217 receiving the pin 218 in fixed relation to the rod 219 of the ten-dollar indicator.

Keys "3", "4" and "5" operate main lever 227 having the three strokes indicated by the position lines 227–3, 227–4 and 227–5. The lever 227 is provided with the neck 226 at one end thereof, and at the other end is pivotally connected to the slotted link 228 receiving the pin 229 in fixed relation to the rod 219 of the ten-dollar indicator.

Having now described the independent operations of these main levers and the parts controlled thereby, I will now set forth the modifications of the operation of the parts controlled by certain of these main levers which are interconnected with other of these main levers.

To illustrate these modified operations, let us assume the keys of the key-board to be manipulated for the monetary value of 25 cents. (Fig. 41). The manipulation of key "2" of the decimal cent bank will cause main lever 112 to assume the position 112–2 giving the indication "2" on the dime indicator. The lever 112 when moved to its position 112–2 actuates lever 253 by means of the link 254 to produce the movement of the floating lever 250 so that the seat of the slot of slotted link 255 is brought in contact with pin 256 in fixed relation to the rod 124 of the quarter indicator, while the pin 251 fixed to floating lever 250, is brought in contact with the head of slot 252 of the link 245. The link 245 is connected at one end to lever 83, and adjacent the other end is provided with the slot 246 receiving the pin 247 of the angle lever 113, these parts being so related that when the lever 112 has been moved to its position 112–2, as stated, the pin 247 reaches the head of slot 246 and is thereby positively limited in its movement. Adjacent the pivotal connection of angle lever 113, the lever 112 is connected to the link 244, operating lever 243 controlling link 240 having the slot 241 (Fig. 41) receiving pin 242 of angle lever 84, these parts being so related that when the lever 112 has been moved to its position 112–2 as stated, the head of slot 241 is brought in contact with pin 242. At this point, it will be seen that these movements of the secondary parts associated with main lever 112 do not affect the normal indication "2", on the dime indicator. However, these secondary parts are brought in suitable positions preparatory to be operative in the event that an interconnecting main lever, such as main-lever 83, is operated. Completing the operation of the assumed value of 25 cents by manipulating key "5" of the unit cent bank, the main lever 83 is moved to its position line 83–5 (Figs. 40 and 41) and the link 245 will move, causing the floating lever 250 to effect by means of slotted link 255 and pin 256 the movement of rod 124, producing the indication "1" on the quarter indicator. Such movement of link 245 effects also the oscillation of angle lever 113, thereby releasing pin 115, allowing rod 106 to assume its normal position by action of its recoil spring, whereby the indication "2" on the dime indicator is "erased." Such movement of main lever 83 also causes the oscillation of angle lever 84 by reason of the pin 242 being held at the head of slot 241 of link 240, thereby relieving pin 86 from engagement with angle lever 84, and preserving the normal position of rod 87 of the nickel indicator. Accordingly, the manipulation of said keys "2" and "5" of the respective decimal cent and unit cent banks, finally produces the indication "1" on the quarter indicator, corresponding to the assumed monetary value of 25 cents (Fig. 41).

It will be noted that if key "5" of the unit cent bank is manipulated prior to the manipulation of key "2" of the decimal cent bank, the same final results are obtained. However, in this case, the indication "1" will appear at first on the nickel indicator, but upon the subsequent manipulation of said key "2" the dial of the nickel indicator will return to "0", and the "0" indication of the dime indicator will not be disturbed.

It will be further noted that if said keys "2" and "5" are simultaneously manipulated, the same final results are obtained, as indicated in Fig. 41. However, in this case, the dials of the dime and nickel indicators will not be disturbed. Upon releasing said keys "2" and "5" the restoration of the main levers 83 and 112 and the secondary parts interconnecting the same from the positions shown in Fig. 41 to their respective neutral positions shown in Fig. 40, is effected by means of recoil spring 275 and the recoil springs of the bell crank levers and of the operated rod 124, described above, and the springs 114 and 85.

As explained above, key "7" of the decimal cent bank also operates main lever 112, consequently, when said key "7" is operated in combination with key "5" of the unit cent bank, the same modified operations as described with reference to the value of 25 cents will be effected, but, of course, with the additional actuation of main lever 153 to produce the indication "1" on the fifty cent indicator.

Also, as explained above, keys "6", "7", "8" and "9" of the unit cent bank operate main lever 83, consequently when any one of these keys of unit cent value is manipulated in combination with either keys "2" or "7" of the decimal cent bank corresponding to the monetary value 26¢, 27¢, 28¢, 29¢, 76¢, 77¢, 78¢, and 79¢, the same modified operations will be effected to produce on the respective dials the proper indications of the required denominations corresponding to these monetary values.

Similar modified operations are effected when any of the keys "3," "8," "4" and "9" of the decimal cent bank is manipulated in combination with any one of the keys "5," "6," "7," "8" and "9" of the unit cent bank. To illustrate these modified operations, let us assume the keys of the key-board to be manipulated for the monetary value of 35¢. The manipulation of key "3" of the decimal cent bank will cause main lever 119 to assume the position indicated by position line 119–3 (Figs. 40 and 42), giving the indication "1" on the quarter indicator and "1" on the nickel indicator. The lever 119 in its position 119–3 has moved the lever 276 by means of the link 120 to produce the movement of the floating lever 277, so that the seat of the slotted link 281 is brought in contact with the pin 282, in fixed relation to the rod 106 of the dime indicator, while the pin 278, fixed to floating lever 277, is brought in contact with the head of slot 279 of the link 280. The link 280 is connected at one end to main lever 83. The end of main lever 119 opposite to the neck 118, is connected to lever 289 by means of link 290, said lever 289 controlling the link 291 provided with slot 292 receiving pin 242 of angle lever 84. These parts are so related that when the main lever 119 is moved to the position 119–3, the head of slot 292 is brought in contact with pin 242. At this point, it will be seen that these movements of the secondary parts associated with main lever 119 do not affect the normal indication "1" on the quarter indicator and "1" on the nickel indicator. However, these secondary parts are brought in suitable position preparatory to be operative in the event that an interconnecting main lever, such as main lever 83, is operated.

Completing the operation of the assumed value of 35 cents by manipulating key "5" of the unit cent bank, main lever 83 is moved to its position line 83–5 (Figs. 40 and 42), and the link 280 will move, causing the floating lever 277 to effect, by means of slotted link 281 and pin 282, the movement of rod 106, producing the indication "1" on the dime indicator. Such movement of main lever 83 will move lever 286 by means of link 287 and the slotted link 285, to effect the oscillation of angle lever 125, thereby releasing pin 127, allowing rod 87 to assume its normal position by action of its recoil spring, whereby the indication "1" on the nickel indicator is "erased." Such movement of main lever 83 also causes the oscillation of angle lever 84 by reason of the pin 242 being held at the head of slot 292 of link 291, thereby relieving pin 86 from engagement with angle lever 84, and preserving the neutral indicator of rod 87 of the nickel indicator. Accordingly, the manipulation of the said keys "3" and "5" of the respective decimal cent and unit cent banks finally produce the indicators "1" on each of the quarter and dime indicators, corresponding to the assumed monetary value of 35 cents (Fig. 42).

Upon releasing said keys "3" and "5"

the restoration of these main levers 83 and 119 and the secondary parts interconnecting the same from the positions shown in Fig. 42 to their respective neutral positions shown in Fig. 40, is effected similar to the restoration as above described.

Again assuming the monetary value of 45 cents, the manipulation of key "4" of the decimal cent bank will cause main lever 133 to assume the position 133–4, giving the indication "1" on each of the quarter, dime and nickel indicators. It will be noted that by the movement of rod 106 of the dime indicator, the pin 313 fixed to rod 106 has moved away from the seat of the slot of slotted link 312 controlled by the floating lever 311.

The lever 133 when moved to its position 133–4 actuates lever 315 by means of link 314 to produce the movement of floating lever 311 so that the seat of the slot of slotted link 312 is brought again in contact with the pin 213 in its advanced position, while the pin 310, fixed to floating lever 311, is brought in contact with the head of slot 309 of link 308 connected to main lever 83. The end of main lever 133 opposite the neck 132 is connected to lever 300 by means of link 301, said lever 300 controlling link 302 provided with the slot 303 receiving pin 242 of angle lever 84. These parts are so related that when the main lever 133 is moved to the position 133–4, the head of slot 303 is brought in contact with the pin 242. At this point, it will be seen that these movements of the secondary parts associated with the main lever 133 does not cause its secondary parts to affect the normal indication "1" on each of the quarter, dime, and nickel indicators. However, these secondary parts are brought in suitable position, preparatory to being operative in the event that in interconnecting main lever, such as main lever 83, is operated.

Completing the operation of the assumed value of 45 cents by manipulating key "5" of the unit cent value, main lever 83 is moved to its position line 83–5 (Figs. 40 and 43) and the link 308 will move, causing the floating lever 311 to effect by means of slotted link 312 and pin 313 the additional movement of rod 106 changing the indication "1" to "2" on the dime indicator. Such movement of main lever 83 will move lever 314 by means of link 315 and the slotted link 316 to effect the oscillation of angle lever 145, thereby releasing pin 147, allowing rod 87 to assume its normal position by action of its recoil spring, whereby the indicator "1" on the nickel indicator is "erased." Such movement of main lever 83 also causes the oscillation of angle lever 84 by reason of the pin 242 being held at the head of slot 303 of link 302, thereby relieving pin 86 from engagement of angle lever 84 and preserving the neutral position of rod 87 of the nickel indicator. Accordingly, the manipulation of the said keys "4" and "5" of the respective decimal cent and unit cent banks finally produce the indication "1" on the quarter indicator and "2" on the dime indicator, corresponding to the assumed monetary value of 45 cents (Fig. 43).

Upon releasing said keys "4" and "5", the restoration of these main levers 83 and 133 and the secondary parts interconnecting the same from the positions shown in Fig. 43 to their respective neutral positions shown in Fig. 40, is effected similar to the restoration as above described.

*Single denomination series of indicators.*—The specific form of connection between the respective operating rods and the indicators controlled thereby is shown in Figs. 45 to 49, inclusive.

Referring to Figs. 45 and 49, the operating rod 58 of the penny indicator is connected to the bell crank lever 320, mounted to oscillate on the bearing rod 321. The connection is effected by means of the pin 322 received in the slot 323 (Fig. 49) adjacent one end of bell crank lever 230, the other end being connected by link 324 to the throw disk 325. Said disk 325 is in fixed relation to sleeve 344 rotatably mounted on shaft 326, and sleeve 344 is in fixed relation to dial 343 of the penny indicator, said dial 343 bearing the indications "0", "1", "2", "3" and "4", for reasons explained hereinbefore. The recoil spring 327, extending from the fixed point 328 to the link 324, serves to assist the return of the dial 343 to "0" indication, when the corresponding key of the key-board is released. The throw disk 325 (Fig. 49) is provided with four notches 325–1, 325–2, 325–3 and 325–4, related to the corresponding integer indication numbers on dial 343 so that when any one of said indicator numbers, such as "1" appears, the corresponding notch 325–1 is brought in alignment with pin 332 of segment 333. Similar connections and relations of the operating rods, recoil springs, throw disks and dials are provided for the remaining indicators of the single denomination series. It will be noted that for sake of simplicity, the bell crank levers 320 of the several indicators are mounted on the common rod 321, and that the rod 326 serves as the common support for the several sleeves 344. The indication numbers on the respective dials of the indicators of the single denomination series have been explained above on page 6, and the number of notches on the throw disks corresponds to the integer indication numbers on the respective dials.

If desired, the dials 343 of the several indicators of the single denomination series may be omitted without altering or modifying the results desired to be attained by this invention.

*Mechanism of total denomination series of indicators.*—The "analysis" of the monetary value into its single denominations is transferred to the proper indicators of the total denomination series 4 upon the operation of the transfer mechanism by means of the handle 5.

Referring to the transfer of penny values (Fig. 49) the pin 332 is shown pivotally connected to segment 333 and guided by the guide 329, and cooperates with the throw disk 325, as stated hereinabove. The segment 333 is rotatably mounted on the shaft 334, and is provided with the heel 335 carrying the roller 336 coacting with the cam 337. The cam 337 is fixed to square arbor 341 carrying at its right hand end the gear 330 meshing with gear 331 (Fig. 51) operated by handle 5, (Fig. 45).

The gear teeth of segment 333 mesh with pinion 342 in fixed relation to throw disk 355 and to the plate 346 carrying the pawl 347 coacting with the ratchet wheel 348. The ratchet wheel 348 is in fixed relation to the star wheel 350 (Fig. 50) and the unit disk 356 of the penny indicator of the total denomination series 4. The periphery of unit disk 356 is divided into ten equal divisions numbered "0" to "9", and the star teeth of star wheel 350 are related to the positioning arm 352, oscillating shaft 353 and tensioned by spring 354, whereby each indication given by unit disk 356 always appears on the same position line.

We will assume that the unit disk 356 shows "0" and that the operating rod 58 has been moved by the manipulation of key "1" of the unit cent bank, whereby throw disk 325 has been rotated so that the notch 325-1 is in alignment with pin 332. Upon turning handle 5 the cam 337 is rotated anti-clockwise, whereupon spring 338 extending from fixed point 339 to the toe 340 of segment 333 oscillates segment 333 through the arc determined by the radial depth of notch 325-1, said oscillation causing throw disk 355, pinion 342 and plate 346 to rotate clockwise for the corresponding arc and thereby moving unit disk 356 to effect the indication "1" by means of pawl 347 and ratchet 348. Completing the full turn of handle 5, the segment 333 and therewith throw disk 355, pinion 342 and plate 346 are returned to their respective neutral positions indicated in Fig. 49 without disturbing the indication "1" given by unit disk 356. Such return oscillation withdraws pin 332 out of notch 325-1 allowing throw disk 325 to return to its neutral position simultaneously with the release of key "1". Let us now assume that key "4" of the unit cent bank is manipulated, whereupon operating rod 58 is moved to rotate throw disk 325 to bring notch 325-4 in alignment with pin 332. Upon turning handle 5, the unit disk 356 is moved through the arc corresponding to four units, whereby the indication will be changed from "1" to "5", thus giving the addition of the two operations. The unit disks of the remaining indicators of the total denomination series 4 are provided with transfer mechanism controlled by the respective operating rods similar to the mechanism controlling the unit disk of the penny indicator.

For the purpose of providing any desired maximum of total indication by the respective indicators of the total denomination series, each indicator is shown as comprising a decimal disk 357 and a hundred disk 358 bearing indications "0" to "9" equally spaced about the periphery, said disks 357 and 358 being so related to the unit disk 356 whereby each complete turn of unit disk 356 turns decimal disk 357 one-tenth of a complete turn, and each complete turn of decimal disk 357 turns hundred disk 358 one-tenth of a complete turn. These results are effected by the provision of the pinion 359 in fixed relation to unit disk 356, meshing with duplicate pinion 360 provided with the fixed projection 361, said projection 361 cooperating with star wheel 362 the latter being in fixed relation to decimal disk 357. Similar parts bearing like reference numbers connect the decimal dial 357 with the hundred disk 358.

It will be clear that when disk 356 has made a complete turn, again showing "0", whereby the pinion 359 has transmitted a complete turn to pinion 360, the projection 361 has encountered a star tooth of star wheel 362, causing the decimal wheel 357 to rotate one-tenth of a complete turn, thereby changing the indication given by decimal disk 357 to the next number.

When it is desired to bring the indicating disks of the several indicators of the total denomination series to "0", provision is made therefor comprising the shaft 363 on which is loosely mounted the combined pinion 360 and projection 361, said shaft 363 being provided with the slot 364, (Figs. 45 and 50) extending longitudinally thereof. The spacing collars 365 are mounted on the shaft 363, and by means of pins 366 extending into slot 364 are movable longitudinally of the shaft 363, but forced to rotate with shaft 363. The spacing collars 365 are each provided with a pawl 367 biased outwardly by spring 368, said pawl 367 coacting with lug 369 fixed to pinion 360. The lug 369 of each pinion 360 assumes the position indicated in Fig. 50, when the indicating disk controlled thereby shows "0".

Accordingly, when the indicating disk indicate integer numbers, the lugs 369 are in displaced position. Accordingly, upon anticlockwise rotation of shaft 363 by means of milled head 7, the pawls 367 encounter their respective lugs 369 and cause the indicating disks of the respective indicators to assume "0" indication. The shaft 363 is provided with the cut-away collar 370 co-operating with the flat spring 371 to locate the neutral position of shaft 363 (Figs. 45 and 51).

The contours of the respective cams 337 of the several indicators comprise descent and ascent portions related in correspondence to maximum indications of the several denominations, as given hereinabove on page 6. For example, considering the cam 337 of the penny indicator (Fig. 49) the portion 372 of cam 337 provides for the descent of segment 333 to the maximum amount of value 4, and the portion 373 provides for the ascent of segment 333 to return the same to normal position. These descent and ascent portions correspond to the assumed rotation of cam 337 in the anticlockwise rotation indicated by arrow 374. To facilitate ease and positiveness in action, the descent portion is constructed of a longer arc than the arc of the ascent portion, whereby the descent period is long as compared with the ascent period.

*Synthesis and adding mechanism for total money value indicator.*—The synthesis and adding mechanism for the total money value indicator 6 is associated with the mechanism of the total denomination series 4, and is constructed to synthetically transform the denominational values into their respective intrinsic monetary values, and combining such intrinsic monetary values to produce the indication of the monetary value represented by the manipulated keys. In the case of two or more successive manipulations of the keys of the key-board, the indicator 6 will indicate the sum of the monetary values represented by the successive manipulation of the keys of the key-board.

Similar mechanism is utilized for transforming the several denominational values into the respective intrinsic monetary values and accordingly it will suffice to describe the synthesis and adding mechanism by reference to the particular construction of the portion of the synthesis and adding mechanism associated with the penny indicator (see Fig. 49).

It will be recalled that the throw-disk 355 is connected in fixed relation to the pinion 342, whereby the extent of oscillation of disk 355 corresponds to the increase in indication of the penny dial 356 of the total denomination series. The throw-disk 355 is provided with notches 355–1, 355–2, 355–3, 355–4, spaced respectively one-tenth of a circumference from each other, and correspond to the divisions of the unit-indicating disk 356 of the penny denominator. Said notches are depressed in radial direction by successively equal amounts and cooperate with pin 380 pivotally connected to arm 381 mounted on shaft 382 and in fixed relation to segment 383. The segment 383 is provided with the roller 384 coacting with cam 385 fixed to the square shaft 341 controlled by handle 5. The teeth of segment 383 mesh with the teeth of pinion 386 loosely mounted on shaft 387, said pinion 386 being in fixed relation to plate 388 carrying the spring pressed pawl 389. Said pawl 389 coacts with the teeth of ratchet wheel 390, and ratchet wheel 390 is in fixed relation to spur gear 391 meshing with the duplicate spur gear 392. Gear 392 is in fixed relation to sleeve 393 loosely mounted on shaft 394, said sleeve 393 being in fixed relation to spur gear 395, the latter being a duplicate of gear 394. Gear 395 meshes with gear 396, a duplicate thereof, said gear 396 being in fixed relation to the unit indicating disk 397 of the total money value indicator 6.

Illustrating the movements of these parts, let us assume key "1" of the unit cent bank is manipulated, thereby rotating throw disk 325 to bring the notch 325–1 in alignment with pin 332. Upon turning handle 5, segment 333 oscillates to cause the unit disk 356 to move through the arc of one indication, and to cause the notch 355–1 of throw disk 355 to be brought in alignment with pin 380. Such turning of handle 5 also rotates cam 385 in anti-clockwise direction, and when the depression 398 of cam 385 reaches roller 384, the segment 383 under action of spring 399 oscillates to rotate pinion 386 through an arc corresponding to the radial depth of notch 355–1, in turn corresponding to one division on unit indicating disk 356 of the penny indicator. The rotation of pinion 386 effects the rotation of plate 388 and ratchet wheel 390, and such extent of rotation of ratchet wheel 390 is transmitted to the unit indicating disk 397 of the total money value indicator 6 through gears 391, 392, 395 and 396, causing the indication "1".

The synthesis mechanism of the remaining indicators of the total money value indicator 6 are similarly provided with segments, pinions, ratchet wheels, etc., bearing like reference numerals as in the penny synthesis mechanism above described; however, the transmission of the intrinsic values corresponding to the respective denominational values is effected by the following grouping:

1. the unit cent values of the penny, nickel and the five cent component of the quarter indications with the unit indicating disk 397 of the total money value indicator 6;

2. the decimal cent values of the dime, twenty cent component of the quarter, and the fifty cent indications with the decimal cent indicating disk 400 of total money value indicator 6;

3. the unit dollar values of the one-dollar, two-dollar and five-dollar values with the unit dollar indicating disk 401 of indicator 6, and 4. connecting the decimal dollar values of the ten-dollar indications with the decimal dollar indicating disk 402 of indicator 6.

Such provision of means of said group (1) is effected by connecting ratchet wheels 403 and 404 in fixed relation to each other and to spur gear 391, whereby rotation of ratchet wheels 403 and 404 is transmitted to the unit indicating disk 397 similarly as in the case of ratchet wheel 390, as above described (Fig. 45).

With respect to group (2), see Figs. 45 and 46, the ratchet wheels 405, 406 and 407 are in fixed relation to each other and to spur gear 408, meshing with spur gear 409 (Fig. 39), duplicate of gear 408, which through ratchet wheel arrangement 410 transmits movement to spur gear 411, meshing with spur gear 412, a duplicate of gear 411, said gear 412 being in fixed relation to the decimal indicating disk 400 of indicator 6.

It will be noted that the quarter indicator of the total denomination series 4 is provided with two segments 413, 414 (Fig. 45) for respectively transmitting the twenty cent and the five cent component values of each quarter indication, said segment 413 operating said ratchet 406 connected to the decimal indicating disk 400 of indicator 6, and said segment 414 operating said ratchet 404 connected to the unit indicating disk 397 of indicator 6.

With respect to group (3) the ratchet wheels 415, 416 and 417 (Figs. 46 and 47) are in fixed relation to each other and to spur gear 418, meshing with spur gear 419, a duplicate of gear 419, thereby transmitting through ratchet arrangement 420 movement to spur gear 421 (Fig. 39) meshing with spur gear 422, a duplicate of spur gear 421, said gear 422 being in fixed relation to unit dollar indicating disk 401 of total money value indicator 6.

With respect to said connection (4), the ratchet wheel 423 (Fig. 47) is in fixed relation to spur gear 424 meshing with spur gear 425, a duplicate of gear 424, said gear 425 through ratchet arrangement 426 transmitting movement to spur gear 427 (Fig. 46) meshing with spur gear 428 in fixed relation to decimal dollar indicating disk 402 of indicator 6, (Fig. 39).

In order to produce independent unidirectional movement of the unit cent disk 397, the decimal cent disk 400, the unit dollar disk 401 and the decimal dollar disk 402 by means of their respective synthesis mechanism, said disks are successively connected to one another by the ratchet mechanism shown in Figs. 53 and 54. For illustration, the unit dollar indicating disk 401 is in fixed relation to spur gear 422 meshing with spur gear 429 having the projection 430 fixed thereto, said projection 430 cooperating with star wheel 431 loosely mounted on shaft 387 and carrying the spring pressed pawl 432. Said pawl 432 coacting with ratchet wheel 434 in fixed relation to star wheel 435 and decimal dollar indicating disk 402. Thus, when unit dollar indicating disk 401 advances from indication "9," the projection 430 engages a tooth of star wheel 431, thereby advancing the indication of decimal dollar indicating disk 402 the value of one by means of the pawl 432 and ratchet 434. On the other hand when decimal dollar indicating disk 402 is moved by spur gear 427 of its synthesis mechanism, such movement will take place without disturbing unit dollar indicating disk 401, (Figs. 39 and 46).

The hundred dollar indicating disk 435, thousand dollar indicating disk 436 and ten thousand dollar indicating disk 437, etc. in the particular illustrated machine are related to one another in the same manner as the unit indicating disk 356, decimal indicating disk 357 and hundred indicating disk 358 of each of the indicators of the total denomination series 4.

The zero-setting arrangement of the total money value indicator 6 is similar to the zero-setting arrangement of the total denomination series 4, above described, and precisely as shown in Fig. 50, and is operated by means of milled head 8 (Figs. 1, 2 and 45).

It will be noted that the ratchet arrangement 410 on the sleeve 438 (Fig. 39) is provided for the purpose of eliminating undue friction and other resistance when the unit cent indicating disk 397 of total money value indicator 6 has completed a full turn, bringing again "0" to view, thereby advancing decimal cent indicating disk 400 one indication. whereby spur gears 412 and 411 are partly rotated, causing sleeve 438 to act as a driving member but ineffective with respect to the spur gear 409, since the pawl 441 merely glides over a notch of the ratchet arrangement 410. For similar purposes, the ratchet arrangement 420 is provided on sleeve 439 (Fig. 39), and the ratchet arrangement 426 on the shaft 440 (Figs. 39 and 47).

It will be recalled that for each denomination there is a throw-disk 325 directly associated therewith and operated by the corresponding operating rod of the analysis mechanism. Thus, the throw-disk 325 of the penny denomination is provided with four notches 325-1, 325-2, 325-3, 325-4, (Fig. 49), the radial depth employed as the unit standard being indicated by the line 445; accordingly notch 325-1 has the radial depth of one unit; notch 325-2 of two units; notch 325-3 of three units; and notch 325-4 of four units. In like manner, the throw disk 325 of the nickel, quarter, fifty-cent, one-dollar and five-dollar denominations are each provided with a single notch 325-1 having the radial depth of one unit. Also, in like manner the throw disks 325 of the dime and two-dollar denominations are each provided with two notches 325-1 and 325-2, the notch 325-1 having the radial depth of one unit, and the notch 325-2 having the radial depth of two units. Also, in like manner, the throw disk 325 of the ten-dollar denomination is provided with five notches of the respective radial depths of one, two, three, four and five units.

Correspondingly, the throw disks 355 of the respective denominations and directly associated with the respective indicators of the total denomination series 4, are provided with notches, the radial depth employed as the unit standard being indicated by the line 446 (Fig. 49). Thus, the throw disk 355 of the penny denomination is provided with four notches of the respective radial depths of one, two, three and four units; the throw disks 355 of the nickel, the five cent component of the quarter, the fifty-cent and the five-dollar denominations are each provided with a single notch having the radial depth of five units; the throw disk 355 of the dime denomination is provided with two notches having the respective radial depths of one and two units; the throw disk 355 of the twenty-cent component of the quarter denomination is provided with the single notch having the radial depth of two units; the throw-disk 355 of the one-dollar denomination is provided with the single notch having the radial depth of one unit; the throw disk 355 of the two dollar denomination is provided with two notches having the respective radial depths of two and four units; and the throw-disk 355 of the ten-dollar denomination is provided with five notches having the respective radial depths of one, two, three, four and five units.

The cams 385 of the respective denominations have each a depressed portion 398 of a depression value corresponding to the maximum operative oscillation of the segment 383 controlled thereby, i. e., corresponding to the radial depth of the deepest notch on the throw disk 355 cooperating therewith.

The cams 337 controlling the respective segments 333 of the total denomination series 4 are arranged on the square shaft 341 so that the rollers 336 are relieved from contact with the cams 337 substantially simultaneously, to thereby effect the substantially simultaneous operative oscillation of the respective segments 333 corresponding to the denominations required for the monetary value represented by the manipulated keys. Each segment 333 thus operated is held at the end of its operative oscillation for a certain period before it is returned to its normal position (Fig. 49).

The depressed portions 398 of the respective cams 385 are displaced relatively to one another and with respect to the rollers 384 of segments 383, so that the operative oscillations of the respective operated segments 383 take place during non-contemporaneous periods, the first of these periods being existent subsequent to the period of operative oscillation of the operated segments 333. By providing such non-contemporaneous periods of operative oscillation of the segments 383, the synthesis and adding operations thereby performed on the indicating disks of the total money value indicator 6 take place in succession. After the final of said non-contemporaneous periods has elapsed, the segments 333 are returned to their neutral positions. In the particular denominator machine illustrated, the period of the operative oscillations of the operated segments 333, and the period extending from the beginning of the initial to the ending of the final of said non-contemporaneous periods of the operative and return oscillations of segments 333, and the period of the return oscillations of segments 333 take place in the order named during a single full turn of handle 5.

The release of the keys of the key-board (Fig. 52) is effected by means of cam 450 coacting with lever 451 having the roller 452 engaging cam 450. The lever 451 carries the link 453 held normally by spring 468 to trip the lug 454 in the direction indicted by arrow 455, thereby turning shaft 456 and each of fingers 457. Said fingers 457 cooperate with the respective release lugs 45 of the four banks of keys. Accordingly, upon turning handle 5, the relief portion 458 of cam 450 will force roller 452 in the direction away from shaft 341, and partially rotate shaft 456 in the direction of arrow 455, causing each of bars 29 of the four banks of keys to be moved in the direction of arrow 459, whereupon the manipulated keys are returned to their neutral positions, as explained hereinbefore. The relief portion 458 of cam 450 is positioned relatively to the cam 337 so that the release of the manipulated keys takes place subsequent to the period of return of the operated segments 333.

Having described the synthesis and adding mechanism, I will now illustrate the operation of the same by taking the monetary value of $28.93, as an example, assuming also that all the indicators read zero.

Upon manipulation of the proper keys of the key-board, the corresponding operating rods of the analysis mechanism actuate the corresponding throw disk 325 of the several denominations to bring the following notches in alignment with the respective throw pins 332, (see Fig. 49):

Denomination__ $10. $5. $2. $1. 50¢ 25¢ 10¢ 5¢ 1¢
Notch _____  2   1   1   1   1   1   1  1  3

Now, upon operating handle 5, the corresponding segments 333 oscillate to produce the proper indications on the unit disks 356 of the respective indicators of the total denomination series 6, and at the same time actuate the corresponding throw disks 355 to bring the corresponding notches in alignment with the respective throw pins 380, (see Fig. 49) as follows:

Denominations_ $10. $5. $2. $1. 50¢ 25¢ 10¢ 5¢ 1¢
Indications ____  2   1   1   1   1  2-5   1  5  3
Notches_____  2   5   2   1   5  2-5   1  5  3

For the certain period during which the operated segments 333 and corresponding throw-disks 355 are held at the end of their respective operative oscillations, the continued further turning of handle 5 operates the corresponding segments 383 in succession as follows:

During the initial of said above-referred to non-contemporaneous periods, the segment 383 of the ten-dollar denomination oscillates to effect the indication "2" on the decimal dollar indicating disk 402 of the total money value indicator 6 (Fig. 39).

During the second of said non-contemporaneous periods, the segment 383 of the five dollar denomination oscillates to effect the indication "5" on the unit dollar indicating disk 401.

During the third of said periods, the segment 383 of the two-dollar denomination oscillates to effect the additional indication of two units on the unit dollar indicating disk 401, giving the resultant indication "7".

During the fourth period, the segment 383 of the one-dollar denomination oscillates to effect the additional indication of one unit on said unit dollar indicating disk 401, giving the resultant indication "8".

During the fifth period, the segment 383 of the fifty-cent denomination oscillates to effect the indication "5" on the decimal cent indicating disk 400.

During the sixth period, the segment 413 of the twenty-cent component of the quarter denomination oscillates to effect the additional indication of two units on the decimal cent indicating disk 400, giving the resultant indication "7".

During the seventh period, the segment 383 of dime denomination oscillates to effect the additional indication of one unit on the decimal cent indicating disk 400, giving the resultant indication "8".

During the eighth period, the segment 414 of the five-cent component of the quarter denomination oscillates to effect the indication "5" on the unit cent indicating disk 397.

During the ninth period, the segment 383 of the nickel denomination oscillates to effect the additional indication of five units on the unit cent indicating disk 397, causing a full turn of disk 397, giving the resultant indication "0" and advancing said decimal cent indicating disk 400 one unit with the resultant indication "9" on said disk 400.

During the tenth period, the segment 383 of the penny denomination oscillates to effect the additional indication of three units on the unit cent indicating disk 397, giving the resultant indication "3".

The total money value indication 6 will now read:

00028 93

Completing the full turn of handle 5, the operated segments 383 are returned to neutral, after which the operated segments 333 are returned to neutral, and then the manipulated keys of the key-board are released, bringing the throw disks 325 to neutral.

Should it be desired to repeat any certain monetary value represented by the manipulated keys, the proper analysis of such certain monetary value and operation of the synthesis denomination indicators and of the synthesis and adding mechanism will be effected without again manipulating the keys representing such value, by depressing "repeat" key 9 (Fig. 52), whereby bell crank lever 460 will be oscillated, causing link 461 to be moved in the direction of arrow 462 and thereby oscillating bell crank lever 463 to lower the free end of link 453 below the lug 454. Accordingly, upon turning handle 5 of the transfer mechanism, the cam 450 and lever 451 will be operated as above described, but the movement of link 453 will be without effect on lug 454, and the depressed keys will remain depressed after handle 5 has completed its full turn, and the second turn of handle 5, the synthesis and adding mechanism will be again operated for the said monetary value. The "repeat" key 9 is provided with suitable retaining means, such as the slot 464 cooperating with the top plate of the forward portion 1 of the machine, whereby the "repeat" key 9 may be retained in depressed position while the handle 5 is turned as many full turns as may be desired.

The "error" key 19 is shown disposed adjacent the "repeat" key 9, said "error" key 19 being connected by bell crank lever 465 and link 466 with lug 454. Accordingly, upon depressing "error" key 19, the link 466 will be moved in the direction of arrow 462, and the shaft 456 turned in the direction of arrow 455, whereby the fingers 457 will trip the respective release lugs 45 of the banks of keys, whereupon the depressed keys and corresponding parts of the analysis mechanism will be returned on the denomination indications and the synthesis and adding operations, provided the "error" key 19 is operated prior to the operation of the handle 5. The spring 467, extending from lug 454 to link 466, serves to restore the "error" key 19 to neutral.

The particular arrangement and construction of the key-board above described and illustrated forms the subject matter of my copending application Serial No. 864,338, filed Sept. 30, 1914.

Whereas I have described my invention by reference to particular forms thereof, it will be understood that many changes and modifications may be made to attain the objects hereinbefore set forth without departing from my invention.

What I claim and desire to secure by Letters Patent is:—

1. In a device of the character described, a key-board formed of banks of manipulatable keys corresponding to solely single unit numbers, a plurality of operable means corresponding to denominations of monetary values, means controlling said operable means for analyzing any certain monetary value represented by the manipulated keys into the minimum number of denominations of equivalent total monetary value and means for positively limiting the extent of operation of said operable means.

2. In a device of the character described, a key-board formed of banks of manipulatable keys corresponding to solely single unit numbers, a plurality of operable means corresponding to denominations of monetary values, indicators controlled by said operable means, means controlling said operable means for analyzing any certain monetary value represented by the manipulated keys into the minimum number of denominations of equivalent total monetary value and means for positively limiting the extent of operation of said operable means.

3. In a device of the character described, a key-board formed of banks of manipulatable keys corresponding to solely single unit numbers, a plurality of operable means corresponding to denominations of monetary values, means controlling said operable means and controlled by said key-board for analyzing any monetary value represented by the manipulated keys into the minimum number of denominations of equivalent total monetary value, means for positively limiting the extent of movement of the operated operable means, means for holding the manipulated keys in manipulated position and means for releasing said holding means.

4. In a device of the character described, a key-board corresponding to solely single unit numbers, a plurality of operable means corresponding to denominations of monetary values, a plurality of registers respectively controlled by said operable means, means controlling said operable means and controlled by said key-board for analyzing any monetary value represented by the manipulated keys into the minimum number of denominations of equivalent total monetary value and means for positively limiting the extent of movement of the operated registers.

5. In a device of the character described, a key-board formed of keys corresponding to solely single unit numbers and arranged in banks according to decimal values, a plurality of operable means corresponding to denominations of monetary values, a plurality of registers controlled by said operable means, means controlling said operable means and controlled by said keys for analyzing any monetary value represented by the manipulated keys into the minimum number of denominations of equivalent total monetary value and means for positively limiting the extent of movement of said operable means.

6. In a device of the character described, a key-board formed of keys corresponding to solely single unit values, means for mounting said keys to effect substantially uniform extent of movement of manipulation, a plurality of operable means corresponding to denominations of monetary value, a plurality of indicators corresponding to denominations of monetary values, means controlling said operable means and controlled by said keys for analyzing any monetary value represented by the manipulated keys into the minimum number of denominations of equivalent total monetary value and means for positively limiting the extent of effective movement of said operable means.

7. In a device of the character described, a key-board having keys arranged in banks according to relative decimal values, means for mounting said key-board to effect manipulation of said keys upon application of substantially equal force, a series of denomination registers arranged spacially side by side according to relative intrinsic value, means controlling said registers and controlled by said keys for analyzing any certain numerical value represented by the manipulated keys into the minimum number of said denominations of equivalent total monetary value and means for positively limiting the extent of operation of said controlling means.

8. In a denominator indicating machine, the combination of a plurality of indicators representing denominations of monetary values, each indicator bearing a series of integers arranged in unit sequence, a keyboard comprising keys corresponding to dollar and cent values, means controlled by said keys and controlling said indicators for analyzing all monetary values including forty-five to forty-nine cent values represented by the manipulated keys into the minimum number of denominations of equivalent total monetary value, means controlling each of said indicators respectively for adding the particular number of such denominations upon successive operation of the keys and means for positively limiting the extent of movement of manipulation of said keys.

9. In a denominator indicating machine, the combination of a plurality of indicators representing denominations of monetary values, each indicator bearing a series of integers arranged in unit sequence, a key-board comprising keys corresponding to dollar and cent values, means for mounting said keys to effect substantially uniform extent of movement of manipulation, means controlled by said keys and controlling said indicators for analyzing all monetary values including forty-five to forty-nine cent values represented by the manipulated keys into the minimum number of denominations of equivalent total monetary value, means controlling each of said indicators respectively for adding the particular number of such denominations upon successive operation of the keys and means for positively limiting the extent of movement of manipulation of said keys.

10. In a device of the character described, the combination of a plurality of indicators representing denominations of monetary values, each indicator comprising decimal and unit indicating means respectively bearing a series of integers arranged in unit sequence, a key-board comprising keys corresponding respectively solely to single integer monetary values, differential selective mechanism controlled by said keys and controlling said indicators respectively, said selective mechanism being arranged and constructed to analyze any certain value represented by the manipulated keys into the minimum number of said denominations of equivalent total value and means for limiting the extent of operation of said differential selective mechanism.

11. In a device of the character described, the combination of a key board comprising keys corresponding to solely single integer values, differential selective mechanism controlled by said keys and constructed to analyze any certain monetary value including the values of forty-five to forty-nine cents represented by the manipulated keys into the minimum denominations of equivalent total monetary value, members corresponding to the respective denominations of monetary value controlled by said selective mechanism, devices corresponding respectively to denominations of monetary value, and means controlled by said members and controlling said denomination devices.

12. In the device of the character described, the combination of a key board comprising keys corresponding to solely single integer values and differential selective mechanism controlled by said keys and constructed to analyze any certain monetary value including the values of forty-five to forty-nine cents represented by the manipulated keys into the minimum denominations of equivalent total monetary value, said selective mechanism comprising levers individually controlled by a plurality of said keys and bars interconnecting said levers.

13. In a device of the character described, a key board comprising keys corresponding to solely single integer values, a plurality of devices corresponding to denominations of monetary values, and selective mechanism controlled by said keys controlling said denomination devices for analyzing any monetary value including the values of forty-five to forty-nine cents respectively represented by the manipulated keys into the minimum number of denominations of equivalent total monetary value, said selective mechanism being operable independently of the order of manipulation of the manipulated keys.

14. In a device of the character described, a key board comprising keys corresponding to solely single unit values, a plurality of devices corresponding to denominations of monetary values, said keys being arranged in banks according to decimal values, and selective mechanism controlled by said keys and controlling said denomination devices for analyzing any monetary value represented by the manipulated keys into the minimum number of denominations of equivalent total monetary value, said selective mechanism being operable independently of the order of manipulation of the manipulated keys.

15. In a device of the character described, analysis mechanism comprising an operable means corresponding to a denomination value, a lever, a yieldable arm pivotally related to said lever, resilient means normally effecting connection between said arm and said operable means, a second lever and yieldable means connecting said second lever with said arm to move said arm counter to said resilient means and effect disconnection with said operable means.

16. In a device of the character described, analysis mechanism comprising an operable means corresponding to a denomination value, a lever, a yieldable arm pivotally related to said lever, resilient means normally effecting connection between said arm and said operable means, a second lever and yieldable means connecting said second lever with said arm to move said arm counter to said resilient means and effect disconnection with said operable means, said yieldable means comprising a slotted element.

17. In a device of the character described, analysis mechanism comprising an operable means corresponding to a denomination value, a lever, a yieldable arm pivotally related to said lever, resilient means normally effecting connection between said arm and said operable means, a second lever and yieldable means connecting said second lever with said arm to move said arm counter to said resilient means and effect disconnection with said operable means, said yieldable means comprising a lever having a fixed fulcrum, a lever having a movable fulcrum and a slotted link.

18. In a device of the character described, a key-board comprising keys corresponding to monetary values, a plurality of rods corresponding to denominations of monetary values and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for modifying the extent of movement of said one rod effected by said lever upon the operation of said certain key.

19. In a device of the character described, a key-board comprising keys corresponding to monetary values, each key bearing a single unit indication, a plurality of rods corresponding to denominations of monetary values and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for modifying the extent of movement of said one rod effected by said lever upon the operation of said certain key.

20. In a device of the character described, a key-board comprising keys corresponding to monetary values, means for positively limiting the extent of movement of manipulation of each key, a plurality of rods corresponding to dominations of monetary values, and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for decreasing the extent of movement of the said one rod effected by said lever upon the operation of said certain key.

21. In a device of the character described, a key-board comprising keys corresponding to monetary values, each key bearing a single unit indication, means for positively limiting the extent of movement of manipulation of each key, a plurality of rods corresponding to denominations of monetary values and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for decreasing the extent of movement of said one rod effected by said lever upon the operation of said certain key.

22. In a device of the character described, a key-board comprising keys corresponding to monetary values, a plurality of rods corresponding to denominations of monetary values and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for neutralizing the extent of movement of said one rod effected by said lever upon the operation of said certain key.

23. In a device of the character described, a key-board comprising keys corresponding to monetary values, each key bearing a single unit indication, a plurality of rods corresponding to denominations of monetary values and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for neutralizing the extent of movement of said one rod effected by said lever upon the operation of said certain key.

24. In a device of the character described, a key-board comprising keys corresponding to monetary values, means for positively limiting the extent of movement of manipulation of each key, a plurality of rods corresponding to denominations of monetary values, and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for neutralizing the extent of movement of the said one rod effected by said lever upon the operation of said certain key.

25. In a device of the character described, a key-board comprising keys corresponding to monetary values, a key bearing a single unit indication, means for positively limiting the extent of movement of manipulation of each key, a plurality of rods corresponding to denominations of monetary values and means for analyzing any certain monetary value represented by the manipulated keys into the minimum denominations of equivalent total monetary value, said analyzing means controlling said rods, said analyzing means including a fulcrumed lever controlled by a certain key and controlling one of said rods and means controlled by another key for neutralizing the extent of movement of said one rod effected by said lever upon the operation of said certain key.

26. In a device of the character described, the combination of a plurality of keys corresponding to monetary values, means for positively limiting the extent of manipulation of said keys, a plurality of registers corresponding to denominations of monetary values, selecting means controlled by said keys for controlling said registers respectively to indicate the particular number of the respective denominations, constituting the minimum denominations of equivalent total monetary value and means for registering the total monetary value of the registrations of said registers.

27. In a device of the character described, the combination of a plurality of keys corresponding to monetary values, means for positively limiting the extent of manipulation of said keys, a plurality of indicators corresponding to denominations of monetary values, selecting means controlled by said keys for controlling said indicators respectively to indicate the particular number of the respective denominations, constituting the minimum denominations of equivalent total monetary value and means for indicating the total monetary value of the indications of said indicators.

28. In a device of the character described, the combination of a plurality of keys corresponding to monetary values, a plurality of registers corresponding to denominations of monetary values, selecting means connecting said keys with said registers to analyze the value represented by the manipulated keys into the particular number of the respective denominations constituting the minimum denominations of equivalent total monetary value and a register for registering the numerical value corresponding to the manipulated keys.

29. In a device of the character described, the combination of a plurality of keys corresponding to monetary values, means for positively limiting the extent of manipulation of said keys, a plurality of registers corresponding to denominations of monetary values, selecting means connecting said keys with said registers to analyze the value represented by the manipulated keys into the particular number of the respective denominations constituting the minimum denominations of equivalent total monetary value and a register for registering the numerical value corresponding to the manipulated keys.

30. In a device of the character described, the combination of a plurality of keys corresponding to monetary values, means for positively limiting the extent of manipulation of said keys, a plurality of indicators corresponding to denominations of monetary values, selecting means connecting said keys with said indicators to analyze the value represented by the manipulated keys into the particular number of the respective denominations constituting the minimum denominations of equivalent total monetary value and an indicator for indicating the numerical value corresponding to the manipulated keys.

31. In a device of the character described, a key-board having manipulatable keys arranged in banks, certain of said keys of said banks being arranged to form groups, a plurality of elements corresponding to predetermined monetary denominational values, and means for analyzing any certain numerical value represented by the manipulated keys into the minimum number of said denominations of equivalent total value, said analyzing means including a part controlled by a key of one group and adapted to impart to one of said elements a definite movement and means controlled by a key of another group for imparting a greater movement to said one element.

32. In a device of the character described, a key-board having manipulatable keys arranged in banks, certain of said keys of said banks being arranged to form groups, a plurality of elements corresponding to predetermined monetary denominational values, and means for analyzing any certain numerical value represented by the manipulated keys into the minimum number of said denominations of equivalent total value, said analyzing means including a part controlled by a key of one group and adapted to impart to one of said elements a definite movement and means controlled by a key of another group for imparting a lesser movement to said one element.

33. In a device of the character described, a series of denomination registers, a keyboard and analysis mechanism controlled by said key-board and controlling said registers for analyzing any certain value represented by the manipulated keys into the minimum number of the monetary denominations of equivalent total value, said analysis mechanism comprising levers, operating rods controlled by said levers and respectively controlling said registers and means for connecting and disconnecting said levers and said operating rods.

34. In a device of the character described, a series of denomination registers, a keyboard and analysis mechanism controlling said registers and controlled by said keyboard for analyzing any certain value represented by the manipulated keys into the minimum number of the monetary denominations of equivalent total value, said analysis mechanism comprising a lever, an operating rod controlled by said lever and controlling one of said registers, a second lever, an operating rod controlled by said second lever and controlling another of said registers and means controlled by said second operating rod for decreasing the extent of operation of said first named operating rod effected by said first named lever.

35. In a device of the character described, a series of denomination registers, a keyboard, and analysis mechanism controlling said registers and controlled by said keyboard for analyzing any certain value represented by the manipulated keys into the minimum number of the monetary denominations of equivalent total value, said analysis mechanism comprising a lever, an operating rod controlled by said lever and controlling one of said registers, a second lever and means operated by said second lever for decreasing the extent of movement of said first named lever on said operating rod.

36. In a device of the character described, a series of denomination registers, a keyboard and analysis mechanism controlling said registers and controlled by said keyboard for analyzing any certain value represented by the manipulated keys into the minimum number of the monetary denominations of equivalent total value, said analysis mechanism comprising a lever, a plurality of operating rods controlled by said lever and respectively controlling certain of said registers, a second lever and means controlled by said second lever for decreasing the extent of movement of said operating rods effected by said first named lever.

37. In a device of the character described, a series of denomination registers, a keyboard and analysis mechanism controlling said registers and controlled by said keyboard for analyzing any certain value represented by the manipulated keys into the minimum number of the monetary denominations of equivalent total value, said analysis mechanism comprising a lever, operating rods controlled by said lever and respectively controlling certain of said registers, a second lever and means controlled by said second lever for determining the number of said operating rods effectively moved by said first named lever.

38. In a device of the character described, a series of denomination registers, a keyboard, and analysis mechanism controlling said registers and controlled by said keyboard for analyzing any certain value represented by the manipulated keys into the minimum number of the monetary denominations of equivalent total value, said analysis mechanism comprising a lever, a plurality of operating rods controlled by said lever and respectively controlling certain of said registers, a second lever and means controlled by said second lever for determining the number and extent of movement of said operating rods effectively moved by said first named lever.

39. In a device of the character described, a series of denomination registers, a keyboard and analysis mechanism controlling said registers and controlled by said keyboard for analyzing any certain value represented by the manipulated keys into the minimum number of the monetary denominations of equivalent total value, said analysis mechanism comprising a lever, a plurality of operating rods controlled by said lever and respectively controlling certain of said registers, a second lever and means controlled by said second lever for nullifying the extent of movement of one of said operating rods normally effected by said first named lever without affecting the extent of movement of another of said operating rods.

40. In a device of the character described, a series of denomination registers, a keyboard and analysis mechanism controlling said registers and controlled by said keyboard for analyzing any certain value represented by the manipulated keys into the minimum number of the monetary denominations of equivalent total valve, said analysis mechanism comprising a lever, a plurality of operating rods controlled by said lever and respectively controlling certain of said registers, a second lever, means controlled by said second lever and controlling one of said registers other than said certain registers, said last named means being controlled by said first named lever and means connecting said second named lever with said last named means.

41. In a device of the character described, a series of denomination registers, a keyboard and analysis mechanism controlling said registers and controlled by said keyboard for analyzing any certain value represented by the manipulated keys into the minimum number of the monetary denominations of equivalent total value, said analysis mechanism comprising a main lever, an operating rod, disconnectible means normally connecting said main lever with said operating rod, a second main lever and means controlled by said second named lever for disconnecting said connecting means.

42. In a device of the character described, analysis mechanism comprising a main lever, an operating rod, a yieldable connection between said main lever and said operating rod, a second main lever, and means for connecting said second main lever with said yieldable connection.

43. In a device of the character described, analysis mechanism comprising a main lever, and operating rod, a yieldable connection between said main lever and said operating rod, a second main lever, a link controlled by said second main lever, and means connecting said link with said yieldable connection.

44. In a device of the character described, analysis mechanism comprising a main lever, an operating rod, a yieldable connection between said main lever and said operating rod, a second main lever, a link having a slot and controlled by said second main lever, and means carried by said second main lever and cooperating with said yieldable connection.

45. In a device of the character described, analysis mechanism comprising a main lever, an operating rod, a yieldable connection between said main lever and said operating rod, a second main lever, a secondary lever controlled by said second main lever, a link having a slot and controlled by said secondary lever, and means carried by said yieldable connection and cooperating with said slot.

46. In a device of the character described, a series of denomination registers, a keyboard and analysis mechanism controlling said registers and controlled by said keyboard for analyzing any certain value represented by the manipulated keys into the equivalent number of minimum number of the denominations, said analysis mechanism comprising a main lever, an operating rod controlled thereby, a second main lever and a lever having a movable fulcrum and controlled by said second named lever and controlling said operating rod.

47. In a device of the character described, analysis mechanism comprising a main lever, an operating rod, a yieldable connection between said main lever and said operating rod, a second main lever, a link having a slot and controlled by said second main lever, a secondary lever having a movable fulcrum, a pin carried by said secondary lever and cooperating with said slot, and a connection between said secondary lever and said yieldable connection.

48. In a device of the character described, analysis mechanism comprising a main lever, an operating rod, a yieldable connection between said main lever and said operating rod, a second main lever, a secondary lever having a fixed fulcrum controlled by said second main lever, a link having a slot connected with said secondary lever, and a pin carried by said yieldable connection and cooperating with said slot.

49. In a device of the character described, a series of denomination indicators, a keyboard and analysis mechanism controlling said indicators and controlled by said keyboard for analyzing any certain value represented by the manipulated keys into the minimum number of the denominations of equivalent total value, said analysis mechanism comprising a main lever, an operating rod, means for connecting said main lever with said rod, a second operating rod and means including a secondary lever for connecting said main lever with said operating second rod.

50. In a device of the character described, a series of denomination indicators, a keyboard and analysis mechanism controlling said indicators and controlled by said keyboard for analyzing any certain value represented by the manipulated keys into the minimum number of the denominations of equivalent total value, said analysis mechanism comprising a main lever, an operating rod, means including a secondary lever for connecting said main lever with said operating rod, a second operating rod, and means including a lever having a movable fulcrum for connecting said main lever with said second operating rod.

51. In a device of the character described, analysis mechanism comprising a main lever, an operating rod, a secondary lever having a fixed fulcrum and controlled by said main lever, a secondary lever having a movable fulcrum and controlled by said first named secondary lever, a second main lever, and a link connecting said second main lever with said second-named secondary lever.

52. In a device of the character described, analysis mechanism comprising a main lever, an operating rod, a secondary lever having a fixed fulcrum and controlled by said main lever, a secondary lever having a movable fulcrum and controlled by said first named secondary lever, a second main lever, and a link connecting said second main lever with said second-named secondary lever, said link having a slot.

53. In a device of the character described, a series of monetary denomination devices, a keyboard and analysis mechanism controlling said devices and controlled by said key board for analyzing any certain value represented by the manipulated keys into the minimum number of denominations of equivalent total value, said analysis mechanism comprising a lever, an operating rod, a pin carried by said rod and a link controlled by said lever and having a slot receiving said pin.

54. In a device of the character described, a series of denomination registers, a key-board and analysis mechanism controlling said registers and controlled by said key-board for analyzing any certain value represented by the manipulated keys into the minimum number of the denominations of equivalent total value, said analysis mechanism comprising a lever, an operating rod, a member yieldably connected with said lever and controlling said operating rod, and resilient means normally positioning said member in predetermined relation to said lever.

55. In a device of the character described, a series of manipulated denomination devices, a key board comprising keys corresponding solely to single unit values and analysis mechanism controlling said devices and controlled by said key board for analyzing any certain value represented by the manipulated keys into the minimum number of the denominations of equivalent total value, said analysis mechanism being operable independently of the order of manipulation of the manipulated keys.

56. In a device of the character described, a series of devices corresponding to denominations of monetary values, a key board comprising keys corresponding to solely single unit values, analysis mechanism controlled by said keys for analyzing any certain value including the respective values of forty-five to forty-nine cents represented by the manipulated keys into the minimum number of the denominations of equivalent total value and means controlled by said analysis mechanism and controlling said denomination devices.

57. In a device of the character described, a series of devices corresponding to denominations of monetary values, a key board comprising keys corresponding to solely single unit values, analysis mechanism controlled by said keys for analyzing any certain value including the respective values of forty-five to forty-nine cents represented by the manipulated keys into the minimum number of the denominations of equivalent total value, said analysis mechanism being operable independently of the order of manipulation of the manipulated keys and means controlled by said analysis mechanism and controlling said denomination devices.

58. The combination of a set of indicators corresponding to denominations of monetary values including a two dollar indicator, a key-board including keys corresponding to dollar values, means for positively limiting the extent of movement of manipulation of said keys, positively controlled means positively actuating said two dollar indicator for effecting the indication of unity upon manipulation of the key-board for the two dollar value, and means for positively limiting the extent of operation of said actuating means.

59. In a device of the character described, the combination of a key-board having manipulatable keys corresponding to number indications, a plurality of indicating means corresponding to predetermined numerical values, means controlled by said key-board for analyzing the numerical value represented by the manipulated keys of said key-board into a minimum number of said predetermined numerical values of equivalent total value, transfer means controlled by said analyzing means and controlling said indicating means, and means operated upon the operation of said transfer means for restoring the manipulated keys to normal position.

60. In a device of the character described, a key-board having manipulatable keys corresponding to number indications, a set of operated means individually corresponding to predetermined numerical values, a second set of operated means individually corresponding to predetermined numerical values, means controlled by said key-board for analyzing any certain numerical value represented by the manipulated keys of said key-board into one or more of said predetermined numerical values, said analyzing means controlling said first set of operated means, and means controlled by said first set of operated means and controlling said second set of operated means to actuate accumulatively upon successive operation of said first set of operated means.

61. In a device of the character described, a key-board having manipulatable keys corresponding to number indications, a set of operated means individually corresponding to predetermined numerical values, a second set of operated means individually corresponding to predetermined numerical values, means controlled by said key-board for analyzing any certain numerical value represented by the manipulated keys of said key-board into one or more of said predetermined numerical values, said analyzing means controlling said first set of operated means, and transfer means for operating said second set of operated means accumulatively upon the successive operation of said first set of operated means.

62. In a device of the character described, a key-board having manipulatable keys corresponding to number indications, a set of indicating means corresponding to predetermined numerical values, a second set of indicating means corresponding to predetermined numerical values, means controlled by said key-board for analyzing any certain numerical value represented by the manipulated keys of said key-board into one or more of said predetermined numerical values, said analyzing means controlling said first set of indicating means, and means for successively transferring the indications given by said first set of indicating means to said second set of indicating means.

63. In a device of the character described, a key-board having manipulatable keys corresponding to individual number indications and arranged in banks, a set of indicating means individually corresponding to predetermined numerical values, a second set of indicating means individually corresponding to predetermined numerical values, means controlled by said key-board for analyzing any certain numerical value represented by the manipulated keys of said key-board into one or more of said predetermined numerical values, said analyzing means controlling said first set of indicating means, and means for successively transferring the indications given by said first set of indicating means to said second set of indicating means.

64. In a device of the character described, a key-board having manipulatable keys corresponding to number indications, a set of indicators corresponding to predetermined numerical values, a total value indicator and means controlled by said key-board for analyzing any certain numerical value represented by the manipulated keys of said key-board into one or more of said predetermined numerical values the sum of which equals said certain numerical value, said analyzing means controlling said set of indicators and said total money value indicator.

65. In a device of the character described, a key-board having manipulatable keys corresponding to number indications, a set of indicating means corresponding to predetermined numerical values, a second set of indicating means corresponding to predetermined numerical values, a total money value indicator, means controlled said key-board for analyzing any certain numerical value represented by the manipulated keys of said key-board into one or more of said predetermined numerical values, said analyzing means controlling said first set of indicating means, and connecting means whereby the indications given by said first set of indicating means are successively transferred to said second set of indicating means and the total money value indicator operated in accordance with the intrinsic value of each successive operation of said first set of indicating means.

66. In a device of the character described, a key-board having manipulatable keys corresponding to number indications, a set of indicating means corresponding to predetermined numerical values, a second set of indicating means corresponding to predetermined numerical values, a total money value indicator, means controlled by said key-board for analyzing any certain numerical value represented by the manipulated keys of said key-board into one or more of said predetermined numerical values, said analyzing means controlling said first set of indicating means, and means for actuating said second set of indicating means in correspondence with the actuation of said first set of indicating means and for restoring said first set of indicating means to neutral position, said total money value indicator being operated to indicate the addition of the successive numerical values represented upon the successive manipulation of said key-board.

67. In a device of the character described, a key-board having manipulatable keys corresponding to number indications, a set of indicating means individually corresponding to predetermined currency values, a second set of indicating means individually corresponding to said predetermined currency values, means controlled by said key-board for analyzing any certain monetary value represented by the manipulated keys of said key-board into one or more of said predetermined currency values, said analyzing means controlling said first set of indicating means, and means for actuating the indicating means of said second set in correspondence to the actuation of the indicators of said first set.

68. In a device of the character described, a key-board having manipulatable keys corresponding to number indications, a set of indicating means individually corresponding to predetermined currency values, a second set of indicating means individually corresponding to the same currency values, means controlled by said key-board for analyzing any certain monetary value represented by the manipulated keys of said key-board into one or more of said predetermined currency values, and means for actuating the indicators of said second set in correspondence to the actuation of the indicators of said first set and for restoring the indicators of said first set to neutral indication.

69. In a device of the character described, a key-board having manipulatable keys corresponding to number indications, a set of indicating means individually corresponding to predetermined currency values, a second set of indicating means individually corresponding to the same currency values, means controlled by said key-board for analyzing any certain monetary value represented by the manipulated keys of said key-board into one or more of said predetermined currency values, said analyzing means controlling the indicating means of said first set, means for actuating the indicating means of said second set in correspondence to the actuation of the indicating means of said first set, and means for restoring the indicating means of said first set to neutral indication.

70. In a device of the character described, a key-board having manipulatable keys corresponding to number indications, a set of indicators individually corresponding to predetermined currency values, a second set of indicators individually corresponding to predetermined currency values, a second set of indicators individually corresponding to the same currency values, means controlled by said key-board for analyzing any monetary value represented by the manipulatable keys of said key-board into one or more of said predetermined currency values, said analyzing means controlling the indicators of said first set, and manually operated means for operating the indicators of said second set in correspondence to the operation of the indicators of said first set.

71. In a device of the character described, a key-board having manipulatable keys corresponding to number indications, a set of indicators individually corresponding to predetermined currency values, a second set of indicators individually corresponding to the same currency values, means controlled by said key-board for analyzing any monetary value represented by the manipulatable keys of said key-board into one or more of said predetermined currency values, said analyzing means controlling the indicators of said first set, manually operated means for operating the indicators of said second set in correspondence to the operation of the indicators of said first set, and means operative upon the operation of said manually operated means for restoring the indicators of said first set to neutral indication.

72. In a device of the character described, a key-board having manipulatable keys corresponding to number indications, a set of indicators individually corresponding to predetermined currency values, a second set of indicators individually corresponding to the same currency values, means controlled by said key-board for analyzing any value represented by the manipulatable keys of said key-board into one or more of said predetermined currency values, said analyzing means controlling the indicators of said first set, and means for restoring the indicators of said first set to neutral indication and the manipulated keys to normal position.

73. In a device of the character described, devices respectively corresponding to monetary denominational values, a key board and analysis mechanism controlling said denominational devices and controlled by said key board, said analysis mechanism comprising a main lever, an operating rod, means including a secondary lever for connecting said main lever with said operating rod, a second operating rod and means including rotatable means provided with a movable pivot for connecting said main lever with said second operating rod.

74. The combination of indicators representing denominations of monetary values, a total indicator, a key-board representing monetary values, means controlled by said key-board for actuating said total indicator for the extent corresponding to the value represented by the manipulated keys and for actuating said denomination indicators to indicate the particular number of the indications constituting the minimum denominations corresponding to the said value represented by the manipulated keys.

75. The combination of a set of indicators corresponding to denominations of monetary values, a key-board comprising keys corresponding to monetary values, a plurality of rods corresponding to denominations of monetary values, means controlled by said keys for analyzing any certain monetary value including the respective values of forty-five cents to forty-nine cents represented by the manipulated keys into the minimum denominations of equivalent total monetary value and for operating the rods corresponding to such minimum denominations and separately operable means controlled by such operated rods for controlling said indicators.

76. The combination of a set of indicators, corresponding to denominations of monetary values, a key-board comprising keys corresponding to monetary values, a plurality of rods corresponding to denominations of monetary values, means controlled by said keys for analyzing any certain monetary value including the respective values of forty-five cents to forty-nine cents represented by the manipulated keys into the minimum denominations of equivalent total monetary value and for advancing the rods corresponding to such minimum denominations in the direction of their lengths respectively and separately operable means controlled by such advanced rods for controlling said indicators.

77. The combination of a set of indicators, corresponding to denominations of monetary values, a key-board comprising keys corresponding to monetary values, a plurality of rods corresponding to denominations of monetary values, means controlled by said keys for analyzing any certain monetary value including the respective values of forty-five cents to forty-nine cents represented by the manipulated keys into the minimum denominations of equivalent total monetary value and for advancing the rods corresponding to such minimum denominations in the direction of their lengths respectively, means for positively limiting the extent of operation of the operated rods, and separately operable means controlled by such advanced rods for controlling said indicators.

In testimony whereof I have signed this specification in the presence of two subscribing witnesses.

MICHELE GUGLIELMO DE SIMONE.

Witnesses:
HENRY J. LUCKE,
K. G. LEARD.